United States Patent
Hsu et al.

(10) Patent No.: US 9,140,876 B2
(45) Date of Patent: *Sep. 22, 2015

(54) PHOTOGRAPHING LENS ASSEMBLY

(71) Applicant: LARGAN PRECISION CO., LTD., Taichung (TW)

(72) Inventors: Po-Lun Hsu, Taichung (TW); Tsung-Han Tsai, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/476,731

(22) Filed: Sep. 3, 2014

(65) Prior Publication Data

US 2014/0368927 A1    Dec. 18, 2014

Related U.S. Application Data

(63) Continuation of application No. 13/849,556, filed on Mar. 25, 2013, now Pat. No. 8,867,149.

(30) Foreign Application Priority Data

Mar. 5, 2013 (TW) .............................. 102107653 U

(51) Int. Cl.
| | | |
|---|---|---|
| G02B 13/18 | (2006.01) | |
| G02B 3/02 | (2006.01) | |
| G02B 9/62 | (2006.01) | |
| G02B 13/00 | (2006.01) | |
| G02B 3/04 | (2006.01) | |
| G02B 5/00 | (2006.01) | |

(52) U.S. Cl.
CPC .............. *G02B 9/62* (2013.01); *G02B 13/0045* (2013.01); *G02B 13/18* (2013.01); *G02B 3/04* (2013.01); *G02B 5/005* (2013.01); *G02B 13/0015* (2013.01)

(58) Field of Classification Search
CPC ...... G02B 13/0045; G02B 9/62; G02B 13/18; G02B 3/04; G02B 13/0015; G02B 5/005
USPC .......................... 359/713, 739, 740, 756, 757
See application file for complete search history.

(56) References Cited

U.S. PATENT DOCUMENTS

| | | | |
|---|---|---|---|
| 8,432,619 B2 | 4/2013 | Huang | |
| 8,531,784 B2 * | 9/2013 | Hashimoto | ................... 359/738 |
| 2012/0188654 A1 | 7/2012 | Huang | |

FOREIGN PATENT DOCUMENTS

| | | | |
|---|---|---|---|
| WO | 2013145547 A1 | 10/2013 | |
| WO | 2014006822 A1 | 1/2014 | |

*Primary Examiner* — Evelyn A Lester
(74) *Attorney, Agent, or Firm* — CKC & Partners Co., Ltd.

(57) ABSTRACT

A photographing lens assembly includes, in order from an object side to an image side, a first lens element, a second lens element, a third lens element, a fourth lens element, a fifth lens element and a sixth lens element. The first lens element with positive refractive power has a convex object-side surface. The second lens element, the third lens element and the fourth lens element have refractive power. The fifth lens element with negative refractive power has a convex object-side surface and a concave image-side surface, wherein the surfaces thereof are aspheric, and at least one of the surfaces thereof has at least one inflection point thereon. The sixth lens element with negative refractive power has a convex object-side surface and a concave image-side surface, wherein the surfaces thereof are aspheric, and at least one of the surfaces thereof has at least one inflection point.

27 Claims, 21 Drawing Sheets

PHOTOGRAPHING LENS ASSEMBLY

RELATED APPLICATIONS

The present application is a continuation of the application Ser. No. 13/849,556, filed Mar. 25, 2013, the entire contents of which are hereby incorporated herein by reference, which claims priority to Taiwan Application Serial Number 102107653, filed Mar. 5, 2013, which is herein incorporated by reference.

BACKGROUND

1. Technical Field

The present disclosure relates to a photographing lens assembly. More particularly, the present disclosure relates to a compact photographing lens assembly applicable to electronic products thereof.

2. Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a structure of four-element lens system or five-element lens system such as the ones disclosed in the U.S. Pat. No. 7,869,142 and the U.S. Pat. No. 8,000,031. Due to the popularity of mobile products with high-end specifications, such as smart phones and PDAs (Personal Digital Assistants), the requirements for high resolution and image quality of modern compact optical lens systems has been increasing significantly. However, the conventional four-element and five-element lens structures cannot satisfy these requirements of the compact optical lens system.

Although other conventional optical lens systems with six-element lens structure such as the one disclosed in the U.S. Publication No. 2013/0033762 A1 is not favorable for effectively reducing the back focal length of the optical lens system due to the arrangement of the refractive powers of the fifth and the sixth lens elements. Therefore, it is not favorable for achieving an even more compact size and not applicable for the cell phones and other portable electronic products. Moreover, this optical lens system has a curved image plane resulting in more peripheral aberrations and thereby is not favorable for improving image quality.

SUMMARY

According to one aspect of the present disclosure, a photographing lens assembly includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element has refractive power. The fourth lens element has refractive power. The fifth lens element with negative refractive power has a convex object-side surface and a concave image-side surface, wherein the object-side surface and the image-side surface of the fifth lens element are aspheric, and the fifth lens element has at least one inflection point on at least one of the object-side surface and the image-side surface thereof. The sixth lens element with negative refractive power has a convex object-side surface and a concave image-side surface, wherein the object-side surface and the image-side surface of the sixth lens element are aspheric, and the sixth lens element has at least one inflection point on at least one of the object-side surface and the image-side surface thereof. The photographing lens assembly has a total of six lens elements with refractive power, each of the first lens element, the second lens element, the third lens element, the fourth lens element, the fifth lens element and the sixth lens element is single and non-cemented lens element. When a focal length of the fifth lens element is f5, a focal length of the sixth lens element is f6, an axial distance between the second lens element and the third lens element is T23, and an axial distance between the third lens element and the fourth lens element is T34, the following relationships are satisfied:

$0 < f6/f5 < 1.2$; and $0.5 < T34/T23 < 1.7$.

According to another aspect of the present disclosure, a photographing lens assembly includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element has refractive power. The fourth lens element has refractive power. The fifth lens element with negative refractive power has a convex object-side surface and a concave image-side surface, wherein the object-side surface and the image-side surface of the fifth lens element are aspheric, and the fifth lens element has at least one inflection point on at least one of the object-side surface and the image-side surface thereof. The sixth lens element with negative refractive power has a concave image-side surface, wherein an object-side surface and the image-side surface of the sixth lens element are aspheric, and the sixth lens element has at least one inflection point on at least one of the object-side surface and the image-side surface thereof. The photographing lens assembly has a total of six lens elements with refractive power, each of the first lens element, the second lens element, the third lens element, the fourth lens element, the fifth lens element and the sixth lens element is single and non-cemented lens element. When a focal length of the fifth lens element is f5, a focal length of the sixth lens element is f6, an axial distance between the second lens element and the third lens element is T23, an axial distance between the third lens element and the fourth lens element is T34, an axial distance between the object-side surface of the first lens element and the image-side surface of the sixth lens element is TD, a maximum image height of the photographing lens assembly is Y, and an axial distance between the image-side surface of the sixth lens element and an image plane is BL, the following relationships are satisfied:

$0 < f6/f5 < 1.2$;

$0.5 < T34/T23 < 1.7$; and $(TD/Y)+(BL/Y) < 1.65$.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
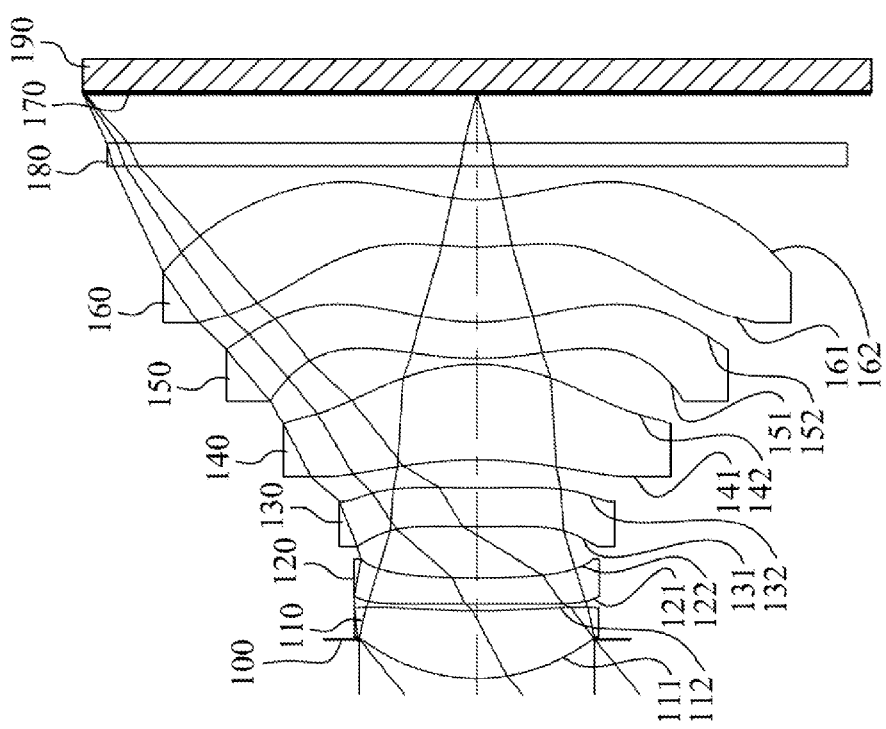
FIG. 1 is a schematic view of a photographing lens assembly according to the 1st embodiment of the present disclosure.

A photographing lens assembly includes, in order from an object side to an image side, a first lens element, a second lens element, a third lens element, a fourth lens element, a fifth lens element and a sixth lens element. The photographing lens assembly has a total of six lens elements with refractive power. Moreover, the photographing lens assembly further includes an image sensor located on an image plane.

The first lens element with positive refractive power has a convex object-side surface and can have a concave image-side surface. Therefore, the total track length of the photographing lens assembly can be reduced by properly adjusting the positive refractive power of the first lens element.

The second lens element can have negative refractive power and a concave image-side surface, so that it is favorable for correcting the aberration generated by the first lens element.

The fourth lens element with positive refractive power can have a concave object-side surface and a convex image-side surface. Therefore, it is favorable for balancing the arrangement of the positive refractive power so as to avoid overloading the positive refractive power on one single lens element resulting in excessive spherical aberrations. It is also favorable for correcting the astigmatism.

The fifth lens element with negative refractive power has a convex object-side surface and a concave image-side surface. Therefore, the Petzval sum of the photographing lens assembly can be corrected effectively, so that the peripheral field of view can be better focused on the image plane in order to improve resolving power. Moreover, the object-side surface of the fifth lens element changes from convex at a paraxial region thereof to concave at a peripheral region thereof, and the image-side surface of the fifth lens element changes from concave at a paraxial region thereof to convex at a peripheral region thereof. The fifth lens element has at least one inflection point on at least one of the object-side surface and the image-side surface. Therefore, the aberration of the off-axis can be further corrected.

The sixth lens element with negative refractive power can have a convex object-side surface and has a concave image-side surface. Therefore, with the negative refractive power of the fifth lens element, the principal point of the photographing lens assembly can be positioned away from the image plane, and the back focal length thereby can be shortened so as to reduce the total track length. Furthermore, the object-side surface of the sixth lens element is convex at a paraxial region thereof and comprises two inflection points between the paraxial region thereof and a peripheral region thereof, and the sixth lens element has at least one inflection point on at least one of the object-side surface and the image-side surface. Therefore, the angle at which the incident light projects onto the image sensor from the off-axis can be effectively reduced, and the aberration of the off-axis can be further corrected.

A projection point of a maximum effective diameter position on the image-side surface of the sixth lens element onto an optical axis is closer to an imaged object than an axial vertex on the object-side surface of the sixth lens element. Therefore, the change of the surface shape of the image-side surface will be more obvious which is favorable for effectively correcting the peripheral aberration.

When a focal length of the fifth lens element is f5, and a focal length of the sixth lens element is f6, the following relationship is satisfied: $0<f6/f5<1.2$. Therefore, it is favorable for effectively correcting the peripheral aberration of the photographing lens assembly and not resulting in a curved image plane. Preferably, the following relationship is satisfied: $0.2<f6/f5<1.0$.

When an axial distance between the object-side surface of the first lens element and the image-side surface of the sixth lens element is TD, a maximum image height of the photographing lens assembly is Y, and an axial distance between the image-side surface of the sixth lens element and the image plane is BL, the following relationship is satisfied: $(TD/Y)+(BL/Y)<1.65$. Therefore, it is favorable for reducing the back focal length of the photographing lens assembly so as to reduce the total track length for maintaining a compact size.

When an axial distance between the second lens element and the third lens element is T23, and an axial distance between the third lens element and the fourth lens element is T34, the following relationship is satisfied: $0.5<T34/T23<1.7$. Therefore, it is favorable for assembling the lens elements so as to increase the manufacturing yield rate.

When a focal length of the photographing lens assembly is f, and the focal length of the sixth lens element is f6, the following relationship is satisfied: $-1.5<f/f6<-0.64$. Therefore, the principal point of the photographing lens assembly can be positioned away from the image plane, and the back focal length together with the total track length thereby can be reduced through properly adjusting the focal length of the sixth lens element.

When an Abbe number of the second lens element is V2, an Abbe number of the third lens element is V3, and an Abbe number of the fifth lens element is V5, the following relationship is satisfied: $15<(V2+V3+V5)/3<40$. Therefore, it is favorable for correcting the chromatic aberration. Preferably, the following relationship is satisfied: $15<(V2+V3+V5)/3<30$.

When a curvature radius of the object-side surface of the fifth lens element is R9, and a curvature radius of the image-side surface of the fifth lens element is R10, the following relationship is satisfied: $0<(R9-R10)/(R9+R10)<0.4$. Therefore, the astigmatism of the photographing lens assembly can be effectively corrected so as to improve the resolving power.

When a distance in parallel with the optical axis from an axial vertex on the object-side surface of the fifth lens element to the maximum effective diameter position on the object-side surface of the fifth lens element is SAG51, and a central thickness of the fifth lens element is CT5, the following relationship is satisfied: $-3<SAG51/CT5<-0.5$. Therefore, the surface shape of the lens elements will not be excessively curved which is thereby favorable for manufacturing and assembling the lens elements so as to keep the photographing lens assembly more compact.

When an incident angle of the chief ray at the maximum image height on the image plane is CRA, the following relationship is satisfied: 30 degrees<CRA<50 degrees. Therefore, it is favorable for controlling the angle at which the incident light projects onto the image sensor so as to improve the responding rate of the image sensor for achieving better image quality.

When an f-number of the photographing lens assembly is Fno, the following relationship is satisfied: $1.2<Fno<2.3$. Therefore, it is favorable for making the photographing lens assembly obtain large aperture so as to take sharp images under insufficient light conditions by fast shutter speed.

When an axial distance between the fourth lens element and the fifth lens element is T45, and an axial distance between the fifth lens element and the sixth lens element is T56, the following relationship is satisfied: $0<T45/T56<0.27$. Therefore, it is favorable for assembling the lens elements and effectively reducing the total track length of the photographing lens assembly so as to keep a compact size.

When a focal length of the fourth lens element is f4, and the focal length of the sixth lens element is f6, the following relationship is satisfied: $-3.0<f4/f6<-0.68$. Therefore, it is favorable for reducing the photosensitivity and the total track length of the photographing lens assembly.

According to the photographing lens assembly of the present disclosure, the lens elements thereof can be made of glass or plastic material. When the lens elements are made of plastic material, the manufacturing costs can be effectively reduced. When the lens elements are made of glass material, the distribution of the refractive power of the photographing lens assembly may be more flexible to design. Furthermore, surfaces of each lens element can be aspheric, so that it is easier to make the surfaces into non-spherical shapes. As a result, more controllable variables are obtained, and the aberration is reduced, as well as the number of required lens elements can be reduced while constructing the photographing lens assembly. Therefore, the total track length of the photographing lens assembly can also be reduced.

According to the photographing lens assembly of the present disclosure, when the lens element has a convex surface, it indicates that the surface is convex at the paraxial region; and when the lens element has a concave surface, it indicates that the surface is concave at the paraxial region.

According to the photographing lens assembly of the present disclosure, the photographing lens assembly can include at least one stop, such as an aperture stop, a glare stop, or a field stop, etc. Said glare stop or said field stop is allocated for reducing stray light while retaining high image quality.

Furthermore, an aperture stop can be configured as a front stop or a middle stop. A front stop which can be disposed between an object and the first lens element provides a longer distance from an exit pupil of the system to an image plane and thereby the generated telecentric effect improves the image-sensing efficiency of the image sensor. A middle stop which can be disposed between the first lens element and the image plane is favorable for enlarging the field of view of the system and thereby provides a wider field of view for the same.

According to the photographing lens assembly of the present disclosure, the photographing lens assembly is featured with good correction ability and high image quality, and can be applied to 3D (three-dimensional) image capturing applications, in products such as digital cameras, mobile devices and tablets.

According to the above description of the present disclosure, the following 1st-10th specific embodiments are provided for further explanation.

1st Embodiment

Figure 2:
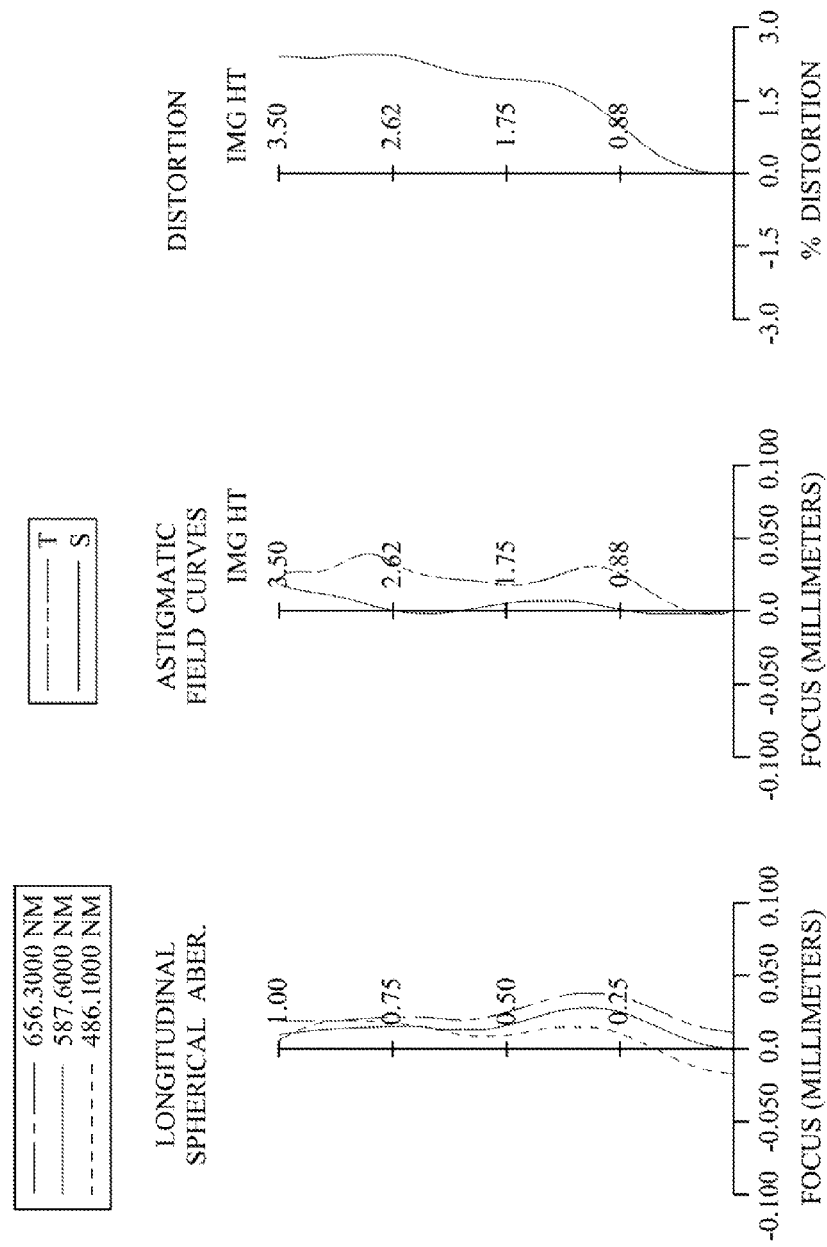
FIG. 2 shows spherical aberration curves, astigmatic field curves and a distortion curve of the photographing lens assembly according to the 1st embodiment.

FIG. 1 is a schematic view of a photographing lens assembly according to the 1st embodiment of the present disclosure. FIG. 2 shows spherical aberration curves, astigmatic field curves and a distortion curve of the photographing lens assembly according to the 1st embodiment. In FIG. 1, the photographing lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 180, an image plane 170 and an image sensor 190. The photographing lens assembly has a total of six lens elements with refractive power.

The first lens element 110 with positive refractive power has a convex object-side surface 111 and a concave image-side surface 112. The first lens element 110 is made of plastic material and has the object-side surface 111 and the image-side surface 112 being aspheric.

The second lens element 120 with negative refractive power has a convex object-side surface 121 and a concave image-side surface 122. The second lens element 120 is made of plastic material and has the object-side surface 121 and the image-side surface 122 being aspheric.

The third lens element 130 with negative refractive power has a convex object-side surface 131 and a concave image-side surface 132. The third lens element 130 is made of plastic material and has the object-side surface 131 and the image-side surface 132 being aspheric.

The fourth lens element 140 with positive refractive power has a concave object-side surface 141 and a convex image-side surface 142. The fourth lens element 140 is made of plastic material and has the object-side surface 141 and the image-side surface 142 being aspheric.

The fifth lens element 150 with negative refractive power has a convex object-side surface 151 and a concave image-side surface 152, wherein the object-side surface 151 of the fifth lens element 150 changes from convex at a paraxial region thereof to concave at a peripheral region thereof, and the image-side surface 152 of the fifth lens element 150 changes from concave at a paraxial region thereof to convex at a peripheral region thereof. Furthermore, both of the object-side surface 151 and the image-side surface 152 of the fifth lens element 150 have at least one inflection point. The fifth lens element 150 is made of plastic material and has the object-side surface 151 and the image-side surface 152 being aspheric.

The sixth lens element 160 with negative refractive power has a convex object-side surface 161 and a concave image-side surface 162, wherein the object-side surface 161 of the sixth lens element 160 is convex at a paraxial region thereof and comprises two inflection points between the paraxial region thereof and a peripheral region thereof. Furthermore, both of the object-side surface 161 and the image-side surface 162 of the sixth lens element 160 have at least one inflection point. The sixth lens element 160 is made of plastic material and has the object-side surface 161 and the image-side surface 162 being aspheric.

Figure 21:
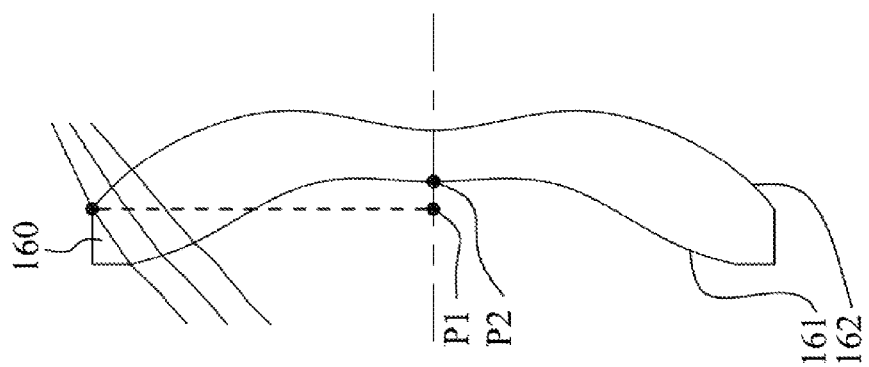
FIG. 21 shows an exemplary figure of a projection point of a maximum effective diameter position on the image-side surface of the sixth lens element onto an optical axis according to the photographing lens assembly of FIG. 1.

A projection point P1 of a maximum effective diameter position on the image-side surface 162 of the sixth lens element 160 onto an optical axis is closer to an imaged object than an axial vertex P2 on the object-side surface 161 of the sixth lens element 160 according to the photographing lens assembly of the first embodiment as shown in FIG. 21.

The IR-cut filter 180 is made of glass, and located between the sixth lens element 160 and the image plane 170, and will not affect the focal length of the photographing lens assembly.

The equation of the aspheric surface profiles of the aforementioned lens elements of the 1st embodiment is expressed as follows:

$$X(Y)=(Y^2/R)/(1+\text{sqrt}(1-(1+k)\times(Y/R)^2))+\Sigma(Ai)\times(Y^i)$$

, wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the photographing lens assembly according to the 1st embodiment, when a focal length of the photographing lens assembly is f, an f-number of the photographing lens assembly is Fno, and half of the maximal field of view of the photographing lens assembly is HFOV, these parameters have the following values: f=4.19 mm; Fno=2.00; and HFOV=39.1 degrees.

In the photographing lens assembly according to the 1st embodiment, when an Abbe number of the second lens element 120 is V2, an Abbe number of the third lens element 130 is V3, and an Abbe number of the fifth lens element 150 is f4, the following relationship is satisfied: (V2+V3+V5)/3=21.4.

In the photographing lens assembly according to the 1st embodiment, when an axial distance between the second lens element 120 and the third lens element 130 is T23, an axial distance between the third lens element 130 and the fourth lens element 140 is T34, an axial distance between the fourth lens element 140 and the fifth lens element 150 is T45, and an axial distance between the fifth lens element 150 and the sixth lens element 160 is T56, the following relationships are satisfied: T34/T23=0.55; and T45/T56=0.07.

In the photographing lens assembly according to the 1st embodiment, when a curvature radius of the object-side surface 151 of the fifth lens element 150 is R9, and a curvature radius of the image-side surface 152 of the fifth lens element 150 is R10, the following relationship is satisfied: (R9−R10)/(R9+R10)=0.19.

In the photographing lens assembly according to the 1st embodiment, when a focal length of the fourth lens element 140 is f4, a focal length of the fifth lens element 150 is f5, a focal length of the sixth lens element 160 is f6 and the focal length of the photographing lens assembly is f, the following relationships are satisfied: f4/f6=−0.80; f6/f5=0.56; and f/f6=−0.71.

Figure 22:
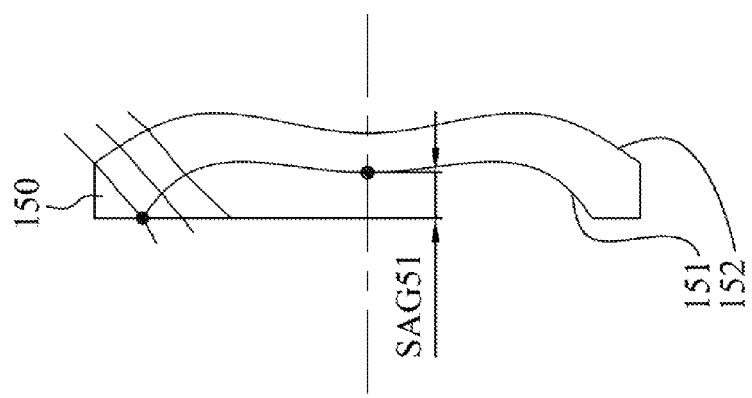
FIG. 22 shows SAG51 of the fifth lens element according to the photographing lens assembly of FIG. 1.

FIG. 22 shows SAG51 of the fifth lens element 150 of the photographing lens assembly according to FIG. 1. In FIG. 22, when a distance in parallel with an optical axis from an axial vertex on the object-side surface 151 of the fifth lens element 150 to a maximum effective diameter position on the object-side surface 151 of the fifth lens element 150 is SAG51 (When the distance towards the object side of the photographing lens assembly is negative, and when the distance towards the image side of the photographing lens assembly is positive), and a central thickness of the fifth lens element 150 is CT5, the following relationship is satisfied: SAG51/CT5=−1.18.

In the photographing lens assembly according to the 1st embodiment, when an incident angle of the chief ray at the maximum image height on the image plane 170 is CRA, the following relationship is satisfied: CRA=32.85 degrees.

In the photographing lens assembly according to the 1st embodiment, when an axial distance between the object-side surface 111 of the first lens element 110 and the image-side surface 162 of the sixth lens element 160 is TD, a maximum image height of the photographing lens assembly (half of a diagonal length of an effective photosensitive area of the image sensor 190) is Y, and an axial distance between the image-side surface 162 of the sixth lens element 160 and an image plane 170 is BL, the following relationship is satisfied: (TD/Y)+(BL/Y)=1.49.

The detailed optical data of the 1st embodiment are shown in Table 1 and the aspheric surface data are shown in Table 2 below.

TABLE 1

1st Embodiment
f = 4.19 mm, Fno = 2.00, HFOV = 39.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.350 | | | | |
| 2 | Lens 1 | 1.676 | ASP | 0.604 | Plastic | 1.565 | 54.5 | 3.72 |
| 3 | | 7.221 | ASP | 0.060 | | | | |
| 4 | Lens 2 | 56.882 | ASP | 0.230 | Plastic | 1.650 | 21.4 | −12.01 |
| 5 | | 6.852 | ASP | 0.454 | | | | |
| 6 | Lens 3 | 13.806 | ASP | 0.351 | Plastic | 1.650 | 21.4 | −213.42 |
| 7 | | 12.430 | ASP | 0.250 | | | | |
| 8 | Lens 4 | −3.703 | ASP | 0.852 | Plastic | 1.565 | 54.5 | 4.69 |
| 9 | | −1.673 | ASP | 0.050 | | | | |
| 10 | Lens 5 | 2.823 | ASP | 0.320 | Plastic | 1.650 | 21.4 | −10.50 |
| 11 | | 1.907 | ASP | 0.671 | | | | |
| 12 | Lens 6 | 3.398 | ASP | 0.424 | Plastic | 1.535 | 55.7 | −5.87 |
| 13 | | 1.561 | ASP | 0.300 | | | | |
| 14 | IR-cut filter | Plano | | 0.200 | Glass | 1.517 | 64.2 | — |
| 15 | | Plano | | 0.454 | | | | |
| 16 | Image | Plano | | — | | | | |

Note:
Reference wavelength (d-line) is 587.6 nm.

TABLE 2

Aspheric Coefficients

| Surface # | 2 | 3 | 4 | 5 | 6 | 7 |
|---|---|---|---|---|---|---|
| k = | 1.8236E−01 | 3.0000E+00 | 3.0000E+00 | −7.9614E+00 | −2.0000E+01 | −2.0000E+01 |
| A4 = | −7.3168E−03 | −4.7080E−02 | −4.5682E−02 | 1.4728E−03 | −1.6934E−01 | −1.2375E−01 |
| A6 = | 3.4749E−02 | −6.5871E−02 | −2.3608E−03 | 4.1007E−02 | 2.4013E−01 | 1.3285E−01 |
| A8 = | −9.0661E−02 | 2.7827E−01 | 3.0479E−01 | 9.1522E−02 | −1.0396E+00 | −3.7280E−01 |
| A10 = | 1.0269E−01 | −3.5974E−01 | −4.8440E−01 | −1.5332E−01 | 2.1704E+00 | 5.3947E−01 |
| A12 = | −5.1432E−02 | 1.9713E−01 | 3.2670E−01 | 7.1663E−02 | −2.6066E+00 | −4.5269E−01 |
| A14 = | 1.5926E−03 | −4.2918E−02 | −7.5873E−02 | 1.9541E−02 | 1.6238E+00 | 2.0672E−01 |
| A16 = | | | | | −3.9106E−01 | −3.6434E−02 |

| Surface # | 8 | 9 | 10 | 11 | 12 | 13 |
|---|---|---|---|---|---|---|
| k = | −1.6564E+01 | −1.7368E+00 | −1.7312E+00 | −7.7362E+00 | −6.2967E+00 | −6.1093E+00 |
| A4 = | −3.0502E−02 | 1.2510E−02 | −1.0421E−01 | −5.1493E−02 | −2.2509E−01 | −1.1460E−01 |
| A6 = | 5.2468E−02 | −1.0970E−02 | 2.5362E−02 | 2.3601E−03 | 9.0299E−02 | 4.6501E−02 |
| A8 = | −3.7130E−02 | 2.0197E−03 | −8.9906E−03 | 3.8807E−03 | −2.3754E−02 | −1.6185E−02 |
| A10 = | 1.6045E−02 | 1.8478E−02 | 1.1884E−03 | −3.3247E−03 | 4.8664E−03 | 4.0635E−03 |
| A12 = | −2.7334E−03 | −1.3541E−02 | −4.7946E−05 | 1.1219E−03 | −6.9413E−04 | −6.2355E−04 |
| A14 = | | 3.6612E−03 | | −1.6849E−04 | 5.7630E−05 | 5.0934E−05 |
| A16 = | | −3.6262E−04 | | 9.5275E−06 | −2.0662E−06 | −1.6907E−06 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
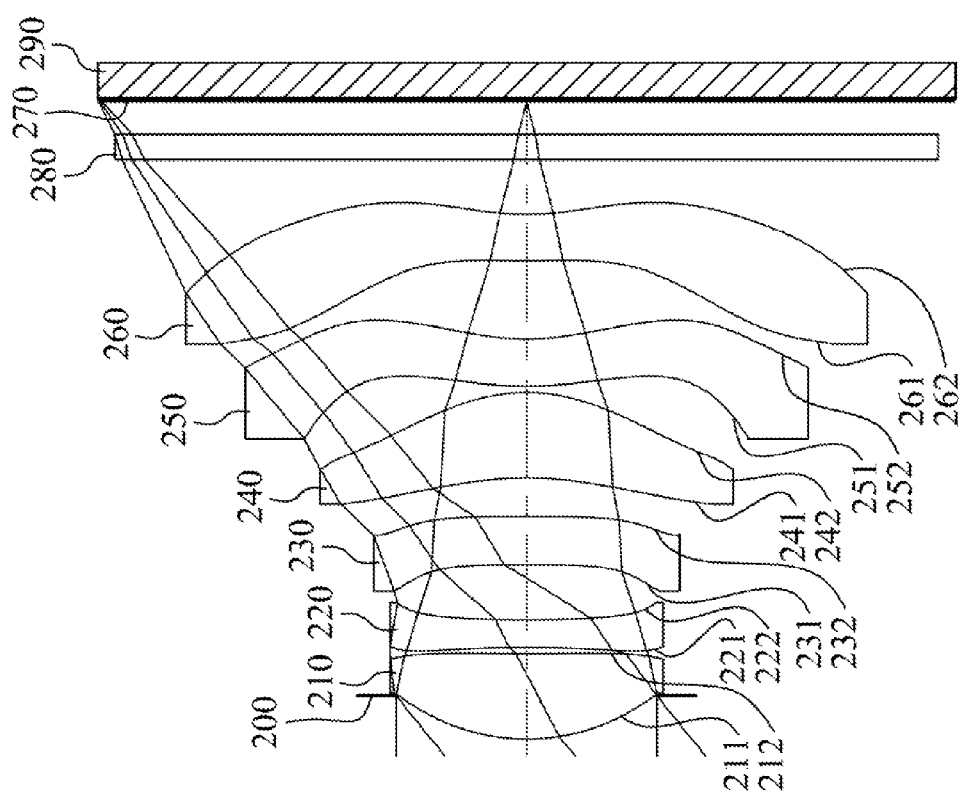
FIG. 3 is a schematic view of a photographing lens assembly according to the 2nd embodiment of the present disclosure.
Figure 4:
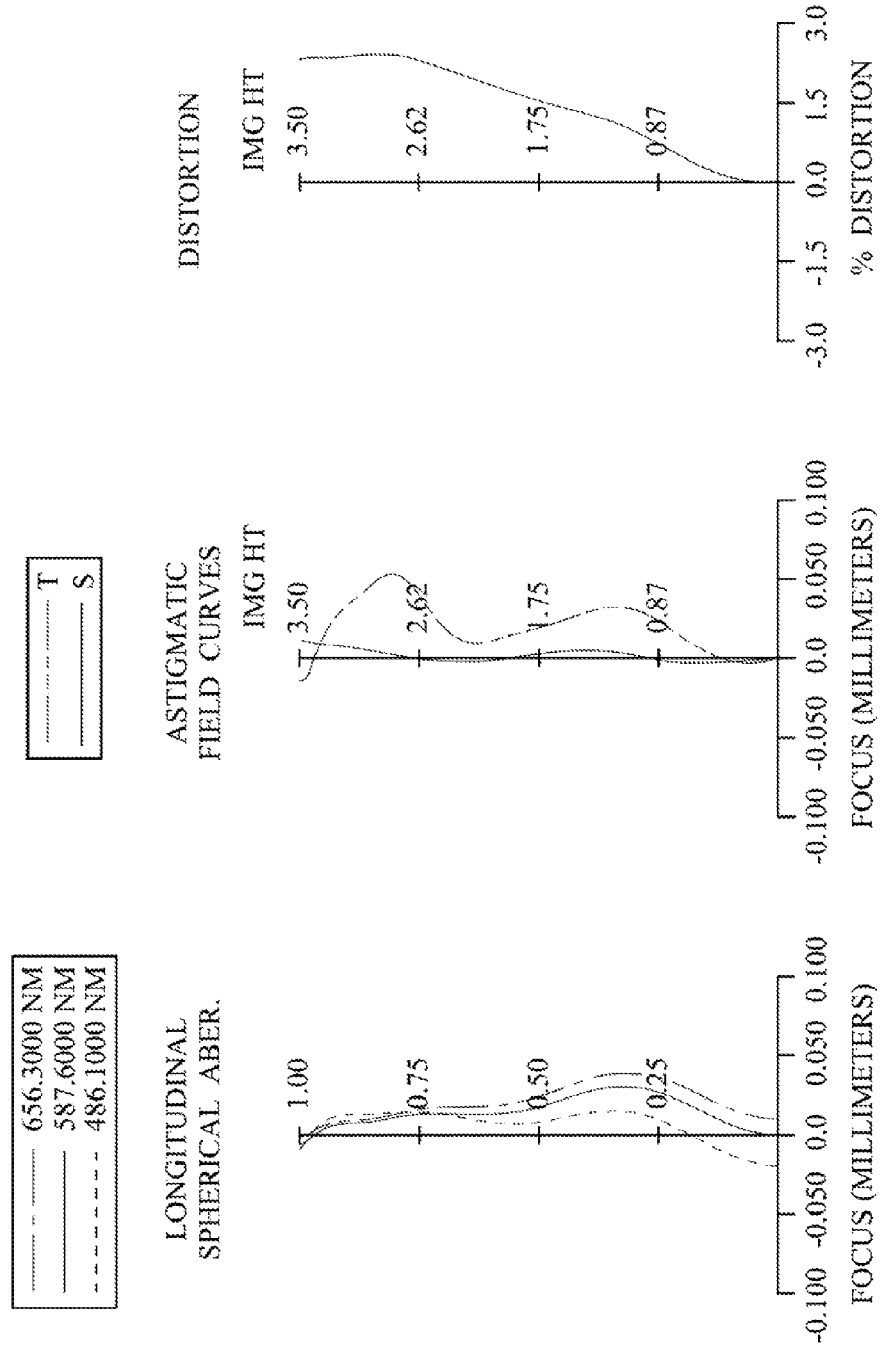
FIG. 4 shows spherical aberration curves, astigmatic field curves and a distortion curve of the photographing lens assembly according to the 2nd embodiment.

FIG. 3 is a schematic view of a photographing lens assembly according to the 2nd embodiment of the present disclosure. FIG. 4 shows spherical aberration curves, astigmatic field curves and a distortion curve of the photographing lens assembly according to the 2nd embodiment. In FIG. 3, the photographing lens assembly includes, in order from an object side to an image side, an aperture stop 200, a first lens element 210, a second lens element 220, a third lens element 230, a fourth lens element 240, a fifth lens element 250, a sixth lens element 260, an IR-cut filter 280, an image plane 270 and an image sensor 290. The photographing lens assembly has a total of six lens elements with refractive power.

The first lens element 210 with positive refractive power has a convex object-side surface 211 and a concave image-side surface 212. The first lens element 210 is made of plastic material and has the object-side surface 211 and the image-side surface 212 being aspheric.

The second lens element 220 with negative refractive power has a concave object-side surface 221 and a concave image-side surface 222. The second lens element 220 is made of plastic material and has the object-side surface 221 and the image-side surface 222 being aspheric.

The third lens element 230 with positive refractive power has a concave object-side surface 231 and a convex image-side surface 232. The third lens element 230 is made of plastic material and has the object-side surface 231 and 1 to the image-side surface 232 being aspheric.

The fourth lens element 240 with positive refractive power has a concave object-side surface 241 and a convex image-side surface 242. The fourth lens element 240 is made of plastic material and has the object-side surface 241 and the image-side surface 242 being aspheric.

The fifth lens element 250 with negative refractive power has a convex object-side surface 251 and a concave image-side surface 252, wherein the object-side surface 251 of the fifth lens element 250 changes from convex at a paraxial region thereof to concave at a peripheral region thereof, and the image-side surface 252 of the fifth lens element 250 changes from concave at a paraxial region thereof to convex at a peripheral region thereof. Furthermore, both of the object-side surface 251 and the image-side surface 252 of the fifth lens element 250 have at least one inflection point. The fifth lens element 250 is made of plastic material and has the object-side surface 251 and the image-side surface 252 being aspheric.

The sixth lens element 260 with negative refractive power has a convex object-side surface 261 and a concave image-side surface 262, wherein the object-side surface 261 of the sixth lens element 260 is convex at a paraxial region thereof and comprises two inflection points between the paraxial region thereof and a peripheral region thereof. Furthermore, both of the object-side surface 261 and the image-side surface 262 of the sixth lens element 260 have at least one inflection point. The sixth lens element 260 is made of plastic material and has the object-side surface 261 and the image-side surface 262 being aspheric.

A projection point P1 of a maximum effective diameter position on the image-side surface 262 of the sixth lens element 260 onto an optical axis is closer to an imaged object than an axial vertex P2 on the object-side surface 261 of the sixth lens element 260. Please refer to FIG. 21 (exemplary figure), the exemplary figure for the second embodiment will not otherwise be provided herein.

The IR-cut filter 280 is made of glass, and located between the sixth lens element 260 and the image plane 270, and will not affect the focal length of the photographing lens assembly.

The detailed optical data of the 2nd embodiment are shown in Table 3 and the aspheric surface data are shown in Table 4 below.

TABLE 3

2nd Embodiment
f = 4.27 mm, Fno = 2.00, HFOV = 38.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.354 | | | | |
| 2 | Lens 1 | 1.700 | ASP | 0.697 | Plastic | 1.544 | 55.9 | 3.45 |
| 3 | | 15.354 | ASP | 0.052 | | | | |
| 4 | Lens 2 | −14.912 | ASP | 0.227 | Plastic | 1.639 | 23.5 | −9.57 |
| 5 | | 10.420 | ASP | 0.450 | | | | |
| 6 | Lens 3 | −166.234 | ASP | 0.397 | Plastic | 1.639 | 23.5 | 350.08 |
| 7 | | −95.455 | ASP | 0.314 | | | | |
| 8 | Lens 4 | −2.728 | ASP | 0.703 | Plastic | 1.544 | 55.9 | 4.53 |
| 9 | | −1.413 | ASP | 0.050 | | | | |
| 10 | Lens 5 | 3.066 | ASP | 0.387 | Plastic | 1.607 | 26.6 | −10.43 |
| 11 | | 1.967 | ASP | 0.636 | | | | |
| 12 | Lens 6 | 10.094 | ASP | 0.384 | Plastic | 1.535 | 55.7 | −4.88 |
| 13 | | 2.047 | ASP | 0.450 | | | | |
| 14 | IR-cut filter | Plano | | 0.200 | Glass | 1.517 | 64.2 | — |
| 15 | | Plano | | 0.293 | | | | |
| 16 | Image | Plano | | — | | | | |

Note:
Reference wavelength (d-line) is 587.6 nm.

TABLE 4

Aspheric Coefficients

| Surface # | 2 | 3 | 4 | 5 | 6 | 7 |
|---|---|---|---|---|---|---|
| k = | 1.8993E−01 | −1.3911E+01 | −1.9653E+01 | −1.2610E+01 | −1.0000E+00 | −1.0000E+00 |
| A4 = | −1.0782E−02 | −5.9204E−02 | −5.2722E−02 | −3.2798E−03 | −1.6197E−01 | −9.5365E−02 |
| A6 = | 4.1184E−02 | −6.7595E−02 | −1.1357E−02 | 3.7169E−02 | 2.3740E−01 | 1.2256E−01 |
| A8 = | −9.9585E−02 | 2.7703E−01 | 3.0899E−01 | 7.8267E−02 | −1.0502E+00 | −3.6621E−01 |
| A10 = | 1.0604E−01 | −3.5821E−01 | −4.8586E−01 | −1.4778E−01 | 2.1842E+00 | 5.3969E−01 |
| A12 = | −5.0413E−02 | 2.0114E−01 | 3.2543E−01 | 8.0110E−02 | −2.5973E+00 | −4.5467E−01 |
| A14 = | 1.8530E−03 | −4.3769E−02 | −7.4980E−02 | 7.4950E−03 | 1.6141E+00 | 2.0586E−01 |
| A16 = | | | | | −3.9104E−01 | −3.6203E−02 |

| Surface # | 8 | 9 | 10 | 11 | 12 | 13 |
|---|---|---|---|---|---|---|
| k = | −7.2267E+00 | −2.0861E+00 | −3.6875E+00 | −9.4455E+00 | −5.9716E+00 | −9.2520E+00 |
| A4 = | 3.3756E−03 | 1.7205E−02 | −8.4845E−02 | −4.3336E−02 | −2.0585E−01 | −1.1763E−01 |
| A6 = | 4.9267E−02 | −1.1024E−02 | 2.0679E−02 | −5.0806E−04 | 8.8619E−02 | 5.0509E−02 |
| A8 = | −4.2879E−02 | 1.0261E−03 | −1.1316E−02 | 3.8012E−03 | −2.3810E−02 | −1.6696E−02 |
| A10 = | 1.4871E−02 | 1.8078E−02 | 1.9349E−03 | −3.2342E−03 | 4.8739E−03 | 4.0300E−03 |
| A12 = | −1.8524E−03 | −1.3555E−02 | −8.7193E−05 | 1.1377E−03 | −6.9338E−04 | −6.1771E−04 |

TABLE 4-continued

Aspheric Coefficients

| A14 = | 3.6847E−03 | −1.6835E−04 | 5.7589E−05 | 5.1441E−05 |
| A16 = | −3.6151E−04 | 8.9079E−06 | −2.0776E−06 | −1.7531E−06 |

In the photographing lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| f [mm] | 4.27 | f4/f6 | −0.93 |
| Fno | 2.00 | f6/f5 | 0.47 |
| HFOV [deg.] | 38.6 | f/f6 | −0.87 |
| (V2 + V3 + V5)/3 | 24.5 | SAG51/CT5 | −1.12 |
| T34/T23 | 0.7 | CRA [deg.] | 33.23 |
| T45/T56 | 0.08 | (TD/Y) + (BL/Y) | 1.50 |
| (R9 − R10)/(R9 + R10) | 0.22 | | |

3rd Embodiment

Figure 5:
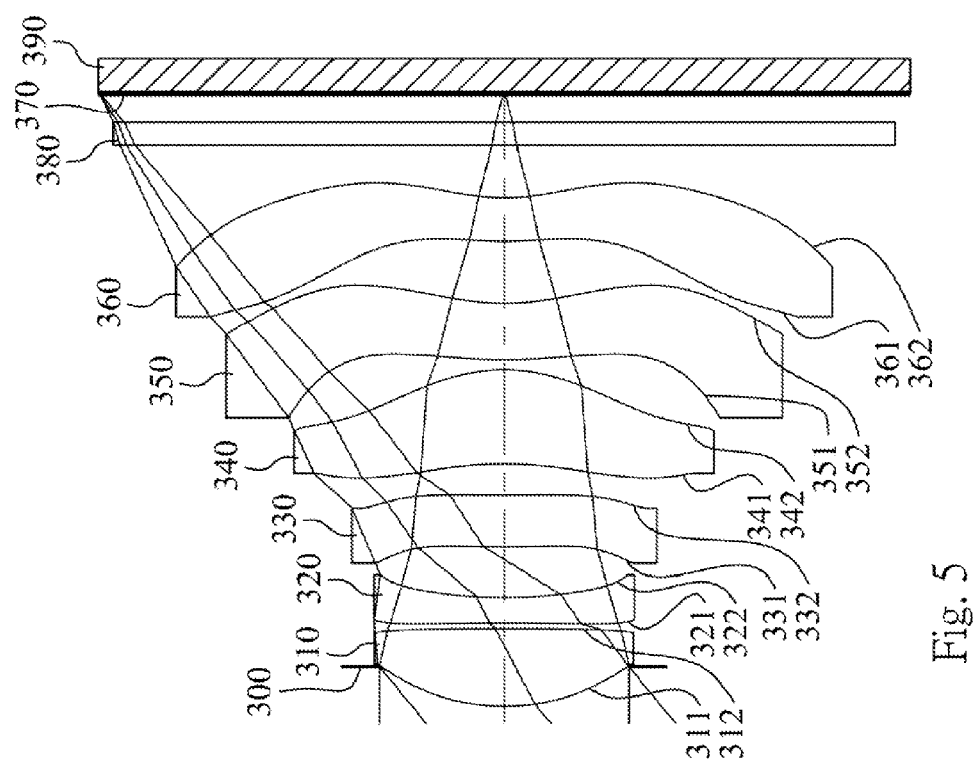
FIG. 5 is a schematic view of a photographing lens assembly according to the 3rd embodiment of the present disclosure.
Figure 6:
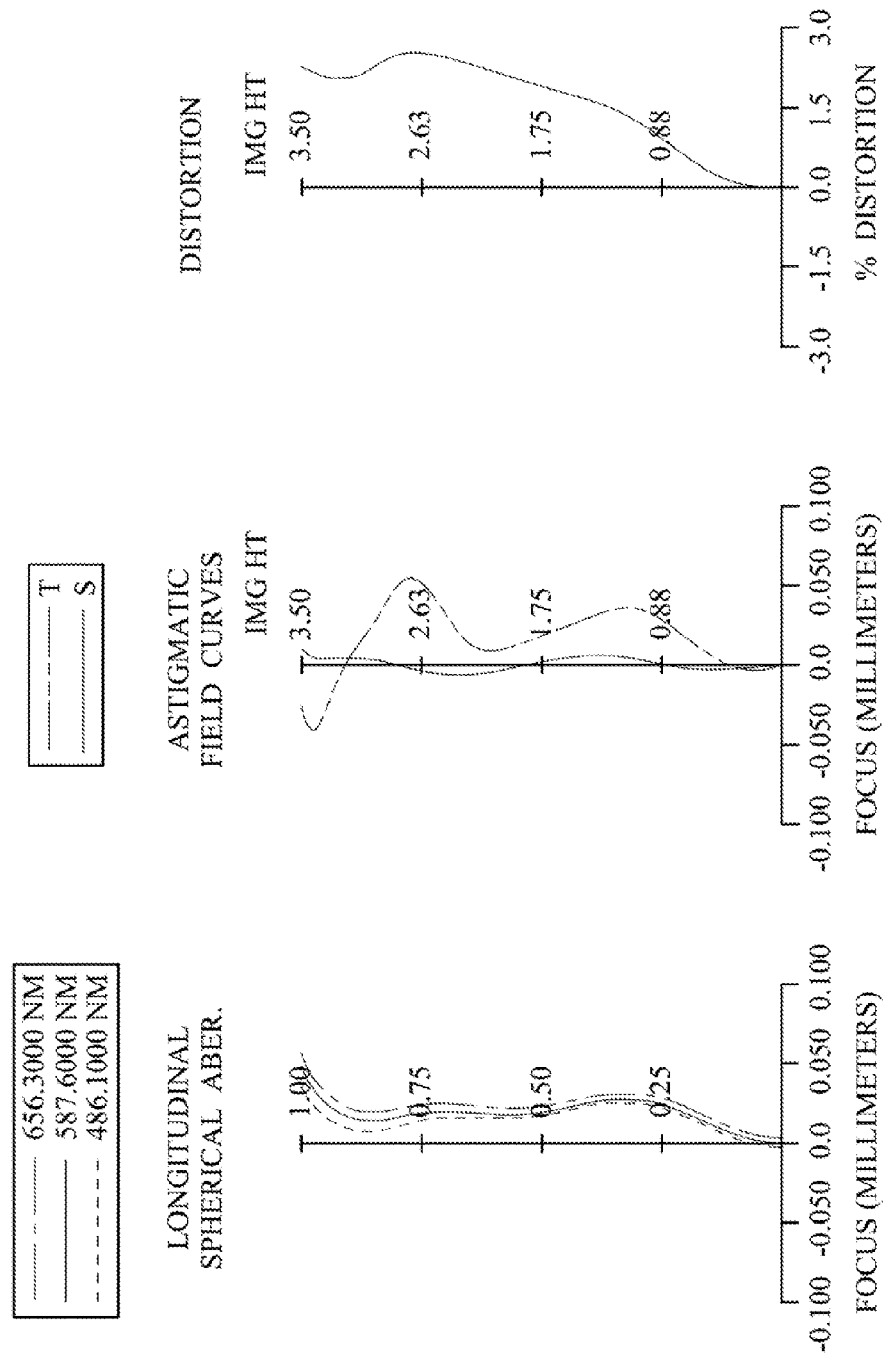
FIG. 6 shows spherical aberration curves, astigmatic field curves and a distortion curve of the photographing lens assembly according to the 3rd embodiment.

FIG. 5 is a schematic view of a photographing lens assembly according to the 3rd embodiment of the present disclosure. FIG. 6 shows spherical aberration curves, astigmatic field curves and a distortion curve of the photographing lens assembly according to the 3rd embodiment. In FIG. 5, the photographing lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 380, an image plane 370 and an image sensor 390. The photographing lens assembly has a total of six lens elements with refractive power.

The first lens element 310 with positive refractive power has a convex object-side surface 311 and a convex image-side surface 312. The first lens element 310 is made of plastic material and has the object-side surface 311 and the image-side surface 312 being aspheric.

The second lens element 320 with negative refractive power has a concave object-side surface 321 and a concave image-side surface 322. The second lens element 320 is made of plastic material and has the object-side surface 321 and the image-side surface 322 being aspheric.

The third lens element 330 with positive refractive power has a convex object-side surface 331 and a concave image-side surface 332. The third lens element 330 is made of plastic material and has the object-side surface 331 and the image-side surface 332 being aspheric.

The fourth lens element 340 with positive refractive power has a concave object-side surface 341 and a convex image-side surface 342. The fourth lens element 340 is made of plastic material and has the object-side surface 341 and the image-side surface 342 being aspheric.

The fifth lens element 350 with negative refractive power has a convex object-side surface 351 and a concave image-side surface 352, wherein the object-side surface 351 of the fifth lens element 350 changes from convex at a paraxial region thereof to concave at a peripheral region thereof, and the image-side surface 352 of the fifth lens element 350 changes from concave at a paraxial region thereof to convex at a peripheral region thereof. Furthermore, both of the object-side surface 351 and the image-side surface 352 of the fifth lens element 350 have at least one inflection point. The fifth lens element 350 is made of plastic material and has the object-side surface 351 and the image-side surface 352 being aspheric.

The sixth lens element 360 with negative refractive power has a convex object-side surface 361 and a concave image-side surface 362, wherein the object-side surface 361 of the sixth lens element 360 is convex at a paraxial region thereof and comprises two inflection points between the paraxial region thereof and a peripheral region thereof. Furthermore, both of the object-side surface 361 and the image-side surface 362 of the sixth lens element 360 have at least one inflection point. The sixth lens element 360 is made of plastic material and has the object-side surface 361 and the image-side surface 362 being aspheric.

A projection point P1 of a maximum effective diameter position on the image-side surface 362 of the sixth lens element 360 onto an optical axis is closer to an imaged object than an axial vertex P2 on the object-side surface 361 of the sixth lens element 360. Please refer to FIG. 21 (exemplary figure), the exemplary figure for the third embodiment will not otherwise be provided herein.

The IR-cut filter 380 is made of glass, and located between the sixth lens element 360 and the image plane 370, and will not affect the focal length of the photographing lens assembly.

The detailed optical data of the 3rd embodiment are shown in Table 5 and the aspheric surface data are shown in Table 6 below.

TABLE 5

3rd Embodiment
f = 4.20 mm, Fno = 1.95, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.347 | | | | |
| 2 | Lens 1 | 1.785 | ASP | 0.674 | Plastic | 1.555 | 55.0 | 3.10 |
| 3 | | −39.418 | ASP | 0.050 | | | | |
| 4 | Lens 2 | −30.637 | ASP | 0.220 | Plastic | 1.640 | 23.3 | −5.61 |
| 5 | | 4.076 | ASP | 0.435 | | | | |
| 6 | Lens 3 | 8.687 | ASP | 0.452 | Plastic | 1.544 | 55.9 | 24.96 |
| 7 | | 23.668 | ASP | 0.266 | | | | |

TABLE 5-continued

3rd Embodiment
f = 4.20 mm, Fno = 1.95, HFOV = 39.0 deg.

| Surface # | | Curvature Radius | | Thickness | Material | Index | Abbe # | Focal Length |
|---|---|---|---|---|---|---|---|---|
| 8 | Lens 4 | −3.318 | ASP | 0.818 | Plastic | 1.535 | 55.7 | 4.28 |
| 9 | | −1.472 | ASP | 0.084 | | | | |
| 10 | Lens 5 | 4.398 | ASP | 0.491 | Plastic | 1.583 | 30.2 | −6.70 |
| 11 | | 1.984 | ASP | 0.533 | | | | |
| 12 | Lens 6 | 3.781 | ASP | 0.380 | Plastic | 1.544 | 55.9 | −6.18 |
| 13 | | 1.717 | ASP | 0.450 | | | | |
| 14 | IR-cut filter | Plano | | 0.200 | Glass | 1.517 | 64.2 | — |
| 15 | | Plano | | 0.252 | | | | |
| 16 | Image | Plano | | — | | | | |

Note:
Reference wavelength (d-line) is 587.6 nm.

TABLE 6

Aspheric Coefficients

| Surface # | 2 | 3 | 4 | 5 | 6 | 7 |
|---|---|---|---|---|---|---|
| k = | 2.3844E−01 | −2.0000E+01 | −2.0000E+01 | −1.6868E+01 | −1.0000E+00 | −1.0000E+00 |
| A4 = | −9.1252E−03 | −2.8357E−03 | −2.7797E−02 | −2.6838E−03 | −1.4969E−01 | −8.6535E−02 |
| A6 = | 3.7848E−02 | −6.2486E−02 | −1.2425E−02 | 3.8604E−02 | 2.3493E−01 | 1.2426E−01 |
| A8 = | −9.3962E−02 | 2.5994E−02 | 2.9849E−01 | 5.9545E−02 | −1.0350E+00 | −3.6649E−01 |
| A10 = | 1.0478E−01 | −3.6212E−01 | −4.9024E−01 | −1.4047E−01 | 2.1863E+00 | 5.3949E−01 |
| A12 = | −5.4324E−02 | 2.0131E−01 | 3.1762E−01 | 1.0635E−01 | −2.6065E+00 | −4.5498E−01 |
| A14 = | 6.5871E−03 | −3.9631E−02 | −6.9039E−02 | −1.5642E−02 | 1.6127E+00 | 2.0548E−01 |
| A16 = | | | | | −3.9106E−01 | −3.6662E−02 |

| Surface # | 8 | 9 | 10 | 11 | 12 | 13 |
|---|---|---|---|---|---|---|
| k = | −4.8377E+00 | −2.5558E+00 | 4.3237E−01 | −1.0921E+01 | −1.9880E+01 | −7.1108E+00 |
| A4 = | 1.1427E−02 | 1.1754E−02 | −7.8643E−02 | −3.9241E−02 | −2.0851E−01 | −1.2166E−01 |
| A6 = | 5.3795E−02 | −9.0493E−03 | 1.8682E−02 | 7.1215E−04 | 8.8610E−02 | 5.0973E−02 |
| A8 = | −4.2022E−02 | 1.8853E−03 | −1.0607E−02 | 3.6829E−03 | −2.3733E−02 | −1.6587E−02 |
| A10 = | 1.4889E−02 | 1.8151E−02 | 2.0294E−03 | −3.2805E−03 | 4.8646E−03 | 4.0264E−03 |
| A12 = | −2.0174E−03 | −1.3571E−02 | −1.3497E−04 | 1.1341E−03 | −6.9432E−04 | −6.2006E−04 |
| A14 = | | 3.6826E−03 | | −1.6797E−04 | 5.7587E−05 | 5.1314E−05 |
| A16 = | | −3.5814E−04 | | 9.0546E−06 | −2.0537E−06 | −1.7201E−06 |

In the photographing lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| f [mm] | 4.20 | f4/f6 | −0.69 |
|---|---|---|---|
| Fno | 1.95 | f6/f5 | 0.92 |
| HFOV [deg.] | 39.0 | f/f6 | −0.68 |
| (V2 + V3 + V5)/3 | 36.5 | SAG51/CT5 | −1.01 |
| T34/T23 | 0.61 | CRA [deg.] | 32.26 |
| T45/T56 | 0.16 | (TD/Y) + (BL/Y) | 1.52 |
| (R9 − R10/(R9 + R10) | 0.38 | | |

4th Embodiment

Figure 7:
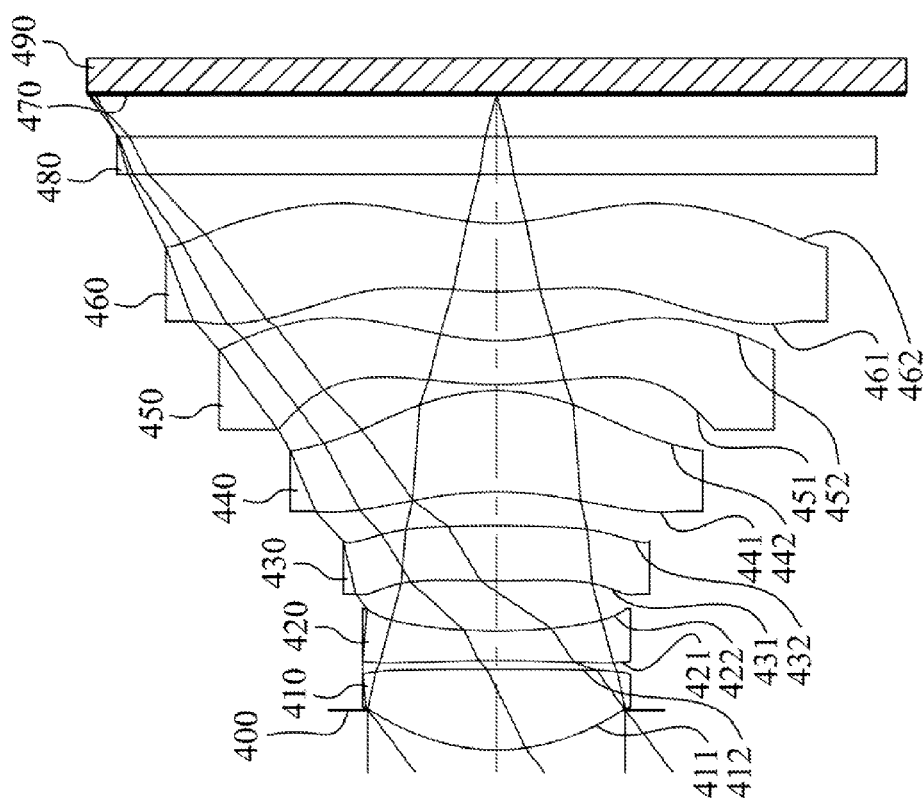
FIG. 7 is a schematic view of a photographing lens assembly according to the 4th embodiment of the present disclosure.
Figure 8:
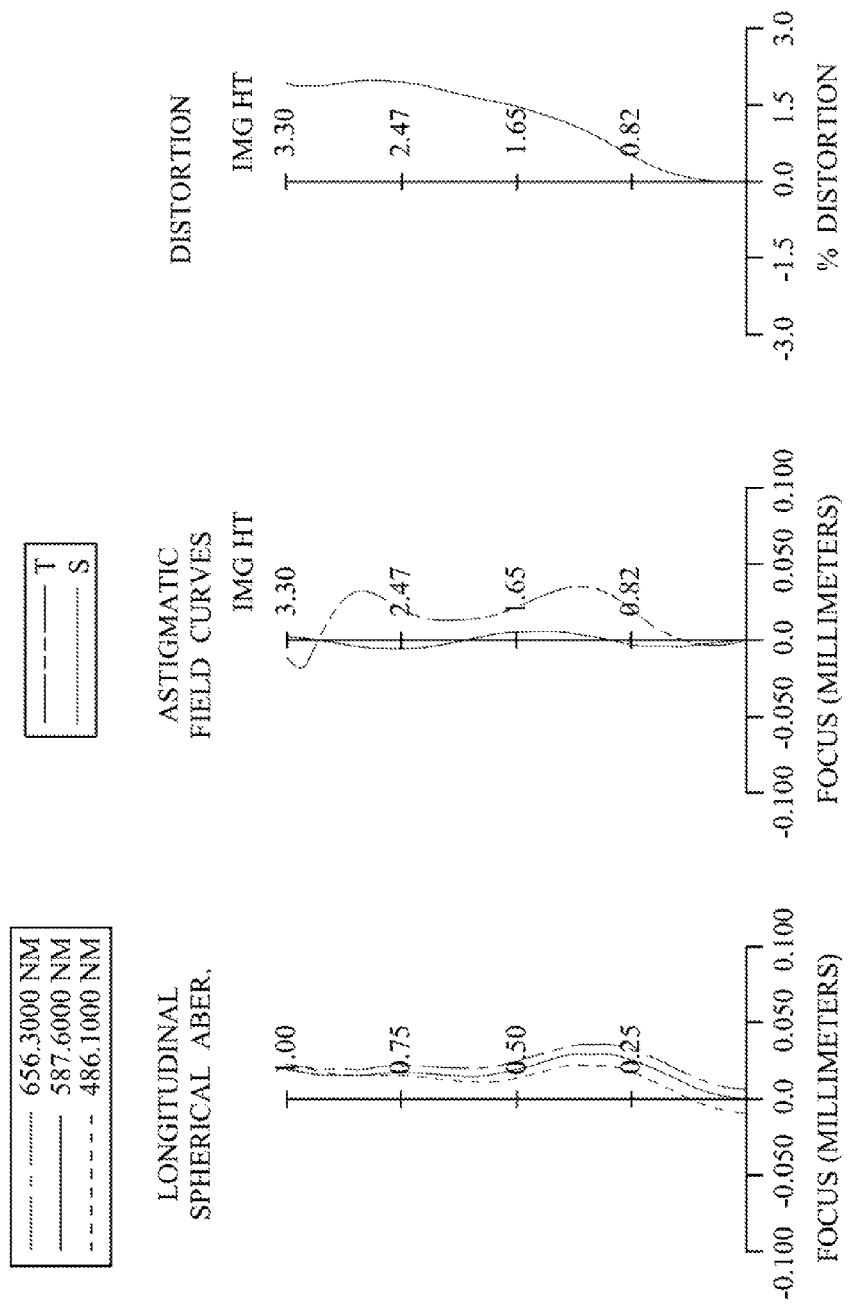
FIG. 8 shows spherical aberration curves, astigmatic field curves and a distortion curve of the photographing lens assembly according to the 4th embodiment.

FIG. 7 is a schematic view of a photographing lens assembly according to the 4th embodiment of the present disclosure. FIG. 8 shows spherical aberration curves, astigmatic field curves and a distortion curve of the photographing lens assembly according to the 4th embodiment. In FIG. 7, the photographing lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 480, an image plane 470 and an image sensor 490. The photographing lens assembly has a total of six lens elements with refractive power.

The first lens element 410 with positive refractive power has a convex object-side surface 411 and a convex image-side surface 412. The first lens element 410 is made of plastic material and has the object-side surface 411 and the image-side surface 412 being aspheric.

The second lens element 420 with negative refractive power has a concave object-side surface 421 and a concave image-side surface 422. The second lens element 420 is made of plastic material and has the object-side surface 421 and the image-side surface 422 being aspheric.

The third lens element 430 with positive refractive power has a convex object-side surface 431 and a convex image-side surface 432. The third lens element 430 is made of plastic material and has the object-side surface 431 and the image-side surface 432 being aspheric.

The fourth lens element 440 with positive refractive power has a concave object-side surface 441 and a convex image-side surface 442. The fourth lens element 440 is made of plastic material and has the object-side surface 441 and the image-side surface 442 being aspheric.

The fifth lens element 450 with negative refractive power has a convex object-side surface 451 and a concave image-side surface 452, wherein the object-side surface 451 of the fifth lens element 450 changes from convex at a paraxial region thereof to concave at a peripheral region thereof, and the image-side surface 452 of the fifth lens element 450 changes from concave at a paraxial region thereof to convex at a peripheral region thereof. Furthermore, both of the object-side surface 451 and the image-side surface 452 of the fifth lens element 450 have at least one inflection point. The fifth lens element 450 is made of plastic material and has the object-side surface 451 and the image-side surface 452 being aspheric.

The sixth lens element 460 with negative refractive power has a convex object-side surface 461 and a concave image-side surface 462, wherein the object-side surface 461 of the sixth lens element 460 is convex at a paraxial region thereof and comprises two inflection points between the paraxial region thereof and a peripheral region thereof. Furthermore, both of the object-side surface 461 and the image-side surface 462 of the sixth lens element 460 have at least one inflection point. The sixth lens element 460 is made of plastic material and has the object-side surface 461 and the image-side surface 462 being aspheric.

The IR-cut filter 480 is made of glass, and located between the sixth lens element 460 and the image plane 470, and will not affect the focal length of the photographing lens assembly.

The detailed optical data of the 4th embodiment are shown in Table 7 and the aspheric surface data are shown in Table 8 below.

TABLE 7

4th Embodiment
f = 4.20 mm, Fno = 2.02, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.320 | | | | |
| 2 | Lens 1 | 1.764 | ASP | 0.652 | Plastic | 1.572 | 54.5 | 3.06 |
| 3 | | −217.526 | ASP | 0.069 | | | | |
| 4 | Lens 2 | −15.967 | ASP | 0.240 | Plastic | 1.633 | 23.4 | −5.54 |
| 5 | | 4.515 | ASP | 0.405 | | | | |
| 6 | Lens 3 | 12.096 | ASP | 0.444 | Plastic | 1.607 | 26.6 | 13.24 |
| 7 | | −23.625 | ASP | 0.275 | | | | |
| 8 | Lens 4 | −2.947 | ASP | 0.818 | Plastic | 1.555 | 55.0 | 4.95 |
| 9 | | −1.562 | ASP | 0.050 | | | | |
| 10 | Lens 5 | 3.292 | ASP | 0.349 | Plastic | 1.607 | 26.6 | −6.47 |
| 11 | | 1.719 | ASP | 0.401 | | | | |
| 12 | Lens 6 | 3.330 | ASP | 0.548 | Plastic | 1.555 | 55.0 | −7.09 |
| 13 | | 1.698 | ASP | 0.400 | | | | |
| 14 | IR-cut filter | Plano | | 0.300 | Glass | 1.517 | 64.2 | — |
| 15 | | Plano | | 0.351 | | | | |
| 16 | Image | Plano | | — | | | | |

Note:
Reference wavelength (d-line) is 587.6 nm.

TABLE 8

Aspheric Coefficients

| Surface # | 2 | 3 | 4 | 5 | 6 | 7 |
|---|---|---|---|---|---|---|
| k = | 2.2999E−01 | −1.0000E+01 | 3.0000E+00 | −7.1362E+00 | −1.0000E+00 | −1.0000E+00 |
| A4 = | −9.0977E−03 | −1.1197E−02 | −1.8560E−02 | −7.9207E−04 | −1.3379E−01 | −8.0079E−02 |
| A6 = | 3.2463E−02 | −6.4799E−02 | −1.7301E−02 | 1.8083E−02 | 2.3793E−01 | 1.2832E−01 |
| A8 = | −8.9680E−02 | 2.5323E−01 | 2.7812E−01 | 8.4950E−02 | −1.0427E+00 | −3.7413E−01 |
| A10 = | 1.0722E−01 | −3.6225E−01 | −4.8153E−01 | −1.4699E−01 | 2.1699E+00 | 5.3850E−01 |
| A12 = | −5.9668E−02 | 2.0672E−01 | 3.3326E−01 | 7.3024E−02 | −2.6051E+00 | −4.5273E−01 |
| A14 = | 6.6019E−03 | −4.2545E−02 | −7.7692E−02 | 1.6523E−02 | 1.6304E+00 | 2.0713E−01 |
| A16 = | | | | | −3.9106E−01 | −3.6385E−02 |

| Surface # | 8 | 9 | 10 | 11 | 12 | 13 |
|---|---|---|---|---|---|---|
| k = | −3.1591E+00 | −1.9709E+00 | −3.8639E+00 | −7.3870E+00 | −1.2293E+00 | −6.0952E+00 |
| A4 = | 3.9653E−03 | 1.7080E−02 | −1.0241E−01 | −5.1948E−02 | −2.0811E−01 | −1.0630E−01 |
| A6 = | 5.3956E−02 | −9.3904E−03 | 2.4761E−02 | 3.6583E−03 | 8.7805E−02 | 4.6673E−02 |
| A8 = | −4.0851E−02 | 1.3557E−03 | −1.0087E−02 | 4.0538E−03 | −2.3752E−02 | −1.6421E−02 |
| A10 = | 1.5224E−02 | 1.8178E−02 | 1.4849E−03 | −3.3445E−03 | 4.8686E−03 | 4.0564E−03 |
| A12 = | −1.9755E−03 | −1.3520E−02 | −1.1813E−04 | 1.1221E−03 | −6.9359E−04 | −6.1875E−04 |
| A14 = | −8.1107E−05 | 3.6934E−03 | 3.4229E−05 | −1.6824E−04 | 5.7699E−05 | 5.1247E−05 |
| A16 = | | −3.6323E−04 | | 9.3141E−06 | −2.0571E−06 | −1.7407E−06 |

In the photographing lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| | | | |
|---|---|---|---|
| f [mm] | 4.20 | f4/f6 | −0.70 |
| Fno | 2.02 | f6/f5 | 1.10 |
| HFOV [deg.] | 37.5 | f/f6 | −0.59 |
| (V2 + V3 + V5)/3 | 25.5 | SAG51/CT5 | −1.05 |
| T34/T23 | 0.68 | CRA [deg.] | 34.95 |
| T45/T56 | 0.12 | (TD/Y) + (BL/Y) | 1.61 |
| (R9 − R10)/(R9 + R10) | 0.31 | | |

5th Embodiment

Figure 9:
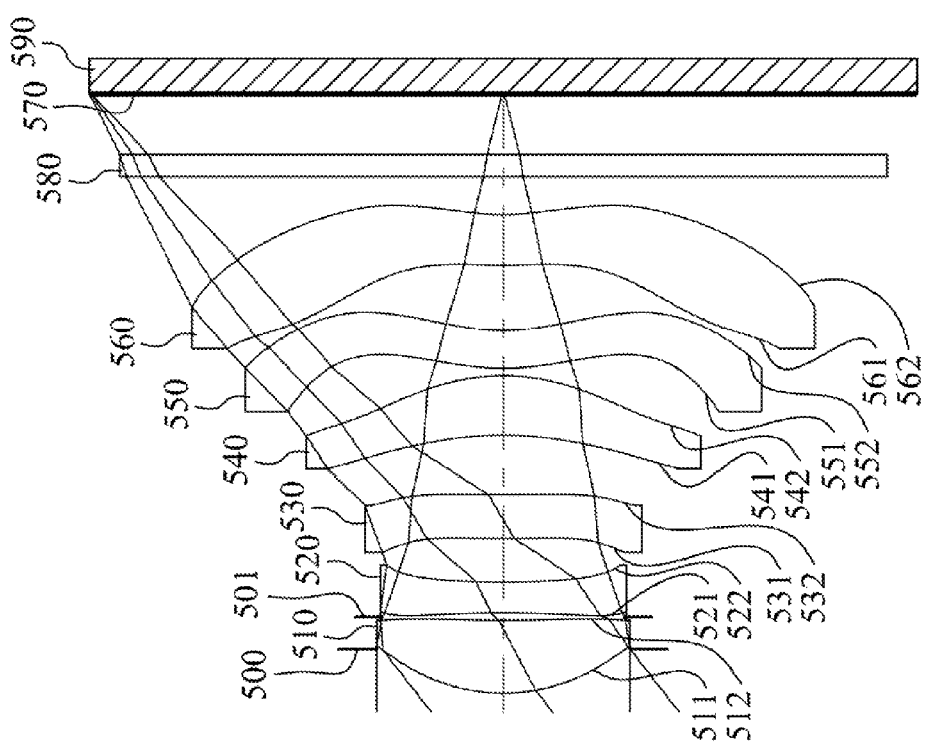
FIG. 9 is a schematic view of a photographing lens assembly according to the 5th embodiment of the present disclosure.
Figure 10:
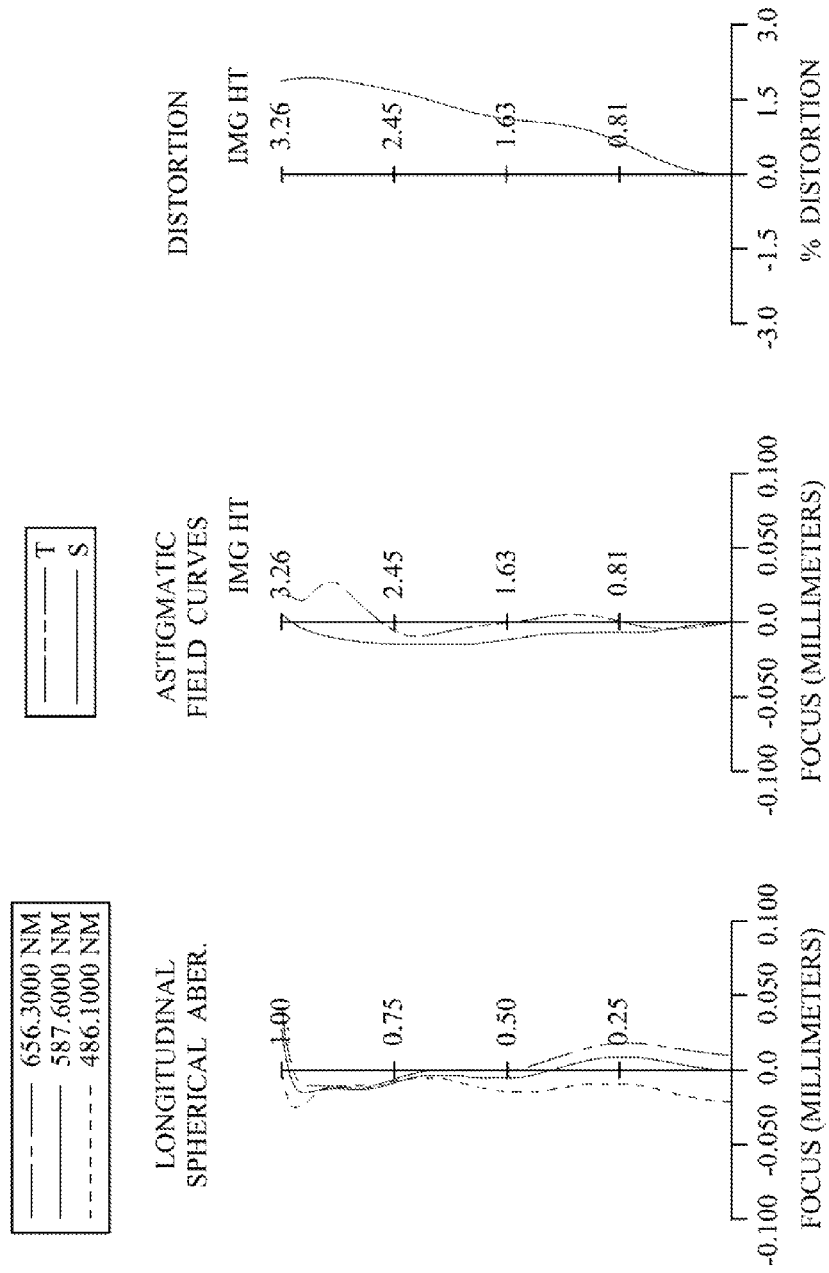
FIG. 10 shows spherical aberration curves, astigmatic field curves and a distortion curve of the photographing lens assembly according to the 5th embodiment.

FIG. 9 is a schematic view of a photographing lens assembly according to the 5th embodiment of the present disclosure. FIG. 10 shows spherical aberration curves, astigmatic field curves and a distortion curve of the photographing lens assembly according to the 5th embodiment. In FIG. 9, the photographing lens assembly includes, in order from an object side to an image side, an aperture stop 500, a first lens element 510, a stop 501, a second lens element 520, a third lens element 530, a fourth lens element 540, a fifth lens element 550, a sixth lens element 560, an IR-cut filter 580, an image plane 570 and an image sensor 590. The photographing lens assembly has a total of six lens elements with refractive power.

The first lens element 510 with positive refractive power has a convex object-side surface 511 and a concave image-side surface 512. The first lens element 510 is made of plastic material and has the object-side surface 511 and the image-side surface 512 being aspheric.

The second lens element 520 with negative refractive power has a concave object-side surface 521 and a concave image-side surface 522. The second lens element 520 is made of plastic material and has the object-side surface 521 and the image-side surface 522 being aspheric.

The third lens element 530 with positive refractive power has a convex object-side surface 531 and a concave image-side surface 532. The third lens element 530 is made of plastic material and has the object-side surface 531 and the image-side surface 532 being aspheric.

The fourth lens element 540 with positive refractive power has a concave object-side surface 541 and a convex image-side surface 542. The fourth lens element 540 is made of plastic material and has the object-side surface 541 and the image-side surface 542 being aspheric.

The fifth lens element 550 with negative refractive power has a convex object-side surface 551 and a concave image-side surface 552, wherein the object-side surface 551 of the fifth lens element 550 changes from convex at a paraxial region thereof to concave at a peripheral region thereof, and the image-side surface 552 of the fifth lens element 550 changes from concave at a paraxial region thereof to convex at a peripheral region thereof. Furthermore, both of the object-side surface 551 and the image-side surface 552 of the fifth lens element 550 have at least one inflection point. The fifth lens element 550 is made of plastic material and has the object-side surface 551 and the image-side surface 552 being aspheric.

The sixth lens element 560 with negative refractive power has a convex object-side surface 561 and a concave image-side surface 562, wherein the object-side surface 561 of the sixth lens element 560 is convex at a paraxial region thereof and comprises two inflection points between the paraxial region thereof and a peripheral region thereof. Furthermore, both of the object-side surface 561 and the image-side surface 562 of the sixth lens element 560 have at least one inflection point. The sixth lens element 560 is made of plastic material and has the object-side surface 561 and the image-side surface 562 being aspheric.

A projection point P1 of a maximum effective diameter position on the image-side surface 562 of the sixth lens element 560 onto an optical axis is closer to an imaged object than an axial vertex P2 on the object-side surface 561 of the sixth lens element 560. Please refer to FIG. 21 (exemplary figure), the exemplary figure for the fifth embodiment will not otherwise be provided herein.

The IR-cut filter 580 is made of glass, and located between the sixth lens element 560 and the image plane 570, and will not affect the focal length of the photographing lens assembly.

The detailed optical data of the 5th embodiment are shown in Table 9 and the aspheric surface data are shown in Table 10 below.

TABLE 9

5th Embodiment
f = 4.11 mm, Fno = 2.05, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.349 | | | | |
| 2 | Lens 1 | 1.469 | ASP | 0.577 | Plastic | 1.544 | 55.9 | 3.13 |
| 3 | | 9.252 | ASP | 0.028 | | | | |
| 4 | Stop | Plano | | 0.030 | | | | |
| 5 | Lens 2 | −14.129 | ASP | 0.240 | Plastic | 1.640 | 23.3 | −7.13 |
| 6 | | 6.786 | ASP | 0.348 | | | | |
| 7 | Lens 3 | 10.104 | ASP | 0.349 | Plastic | 1.640 | 23.3 | 48.31 |
| 8 | | 14.808 | ASP | 0.470 | | | | |
| 9 | Lens 4 | −2.483 | ASP | 0.471 | Plastic | 1.544 | 55.9 | 7.25 |
| 10 | | −1.626 | ASP | 0.056 | | | | |
| 11 | Lens 5 | 1.971 | ASP | 0.300 | Plastic | 1.640 | 23.3 | −26.15 |
| 12 | | 1.658 | ASP | 0.518 | | | | |
| 13 | Lens 6 | 5.605 | ASP | 0.400 | Plastic | 1.544 | 55.9 | −5.33 |
| 14 | | 1.863 | ASP | 0.300 | | | | |
| 15 | IR-cut filter | Plano | | 0.175 | Glass | 1.517 | 64.2 | — |

TABLE 9-continued

5th Embodiment
f = 4.11 mm, Fno = 2.05, HFOV = 38.0 deg.

| Surface # | | Curvature Radius | Thickness | Material | Index | Abbe # | Focal Length |
|---|---|---|---|---|---|---|---|
| 16 | | Plano | 0.481 | | | | |
| 17 | Image | Plano | — | | | | |

Note:
Reference wavelength (d-line) is 587.6 nm.
Half of the effective diameter of the stop at Surface 4 is 0.971 mm.

TABLE 10

Aspheric Coefficients

| Surface # | 2 | 3 | 5 | 6 | 7 | 8 |
|---|---|---|---|---|---|---|
| k = | 1.8148E−01 | 1.2867E+01 | −9.0000E+01 | −2.5675E+01 | −8.9994E+01 | −1.6435E+01 |
| A4 = | −1.5552E−02 | −1.0704E−01 | −1.0612E−01 | −1.9819E−02 | −1.6385E−01 | −1.2545E−01 |
| A6 = | 6.8830E−02 | 1.0362E−02 | 1.8141E−01 | 2.1235E−01 | 1.3267E−01 | 1.6650E−01 |
| A8 = | −2.1397E−01 | 3.5940E−01 | 2.3677E−01 | −1.6148E−01 | −9.3131E−01 | −6.9014E−01 |
| A10 = | 2.8715E−01 | −6.9572E−01 | −7.9521E−01 | 3.2473E−02 | 2.5726E+00 | 1.3326E+00 |
| A12 = | −1.6495E−01 | 5.2375E−01 | 7.7702E−01 | −1.4009E−02 | −4.0399E+00 | −1.4304E+00 |
| A14 = | | −1.5437E−01 | −2.3796E−01 | 1.0642E−01 | 3.2486E+00 | 8.1326E−01 |
| A16 = | | | | | −9.9216E−01 | −1.7643E−01 |

| Surface # | 9 | 10 | 11 | 12 | 13 | 14 |
|---|---|---|---|---|---|---|
| k = | −2.7374E+00 | −1.8467E+00 | −7.3605E+00 | −7.2304E+00 | −9.0000E+01 | −1.0459E+01 |
| A4 = | 5.2244E−02 | −9.0721E−03 | −9.7430E−02 | −9.0611E−02 | −2.9819E−01 | −1.8506E−01 |
| A6 = | −1.9742E−02 | 4.8002E−02 | 2.3597E−02 | 2.2509E−02 | 1.3112E−01 | 9.7934E−02 |
| A8 = | −1.4118E−02 | −7.8975E−02 | −1.6046E−02 | −6.0443E−03 | −1.5472E−02 | −3.8677E−02 |
| A10 = | 1.2518E−02 | 9.4245E−02 | 3.7155E−03 | −1.0453E−03 | −4.5029E−03 | 1.1406E−02 |
| A12 = | −2.1790E−03 | −5.1702E−02 | −2.5343E−04 | 1.2475E−03 | 1.7984E−03 | −2.2323E−03 |
| A14 = | | 1.2639E−02 | | −2.8291E−04 | −2.3574E−04 | 2.4604E−04 |
| A16 = | | −1.1375E−03 | | 2.0154E−05 | 1.0823E−05 | −1.1382E−05 |

In the photographing lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| f [mm] | 4.11 | f4/f6 | −1.36 |
|---|---|---|---|
| Fno | 2.05 | f6/f5 | 0.20 |
| HFOV [deg.] | 38.0 | f/f6 | −0.77 |
| (V2 + V3 + V5)/3 | 23.3 | SAG51/CT5 | −1.13 |
| T34/T23 | 1.35 | CRA [deg.] | 34.24 |
| T45/T56 | 0.11 | (TD/Y) + (BL/Y) | 1.45 |
| (R9 − R10)/(R9 + R10) | 0.09 | | |

6th Embodiment

Figure 11:
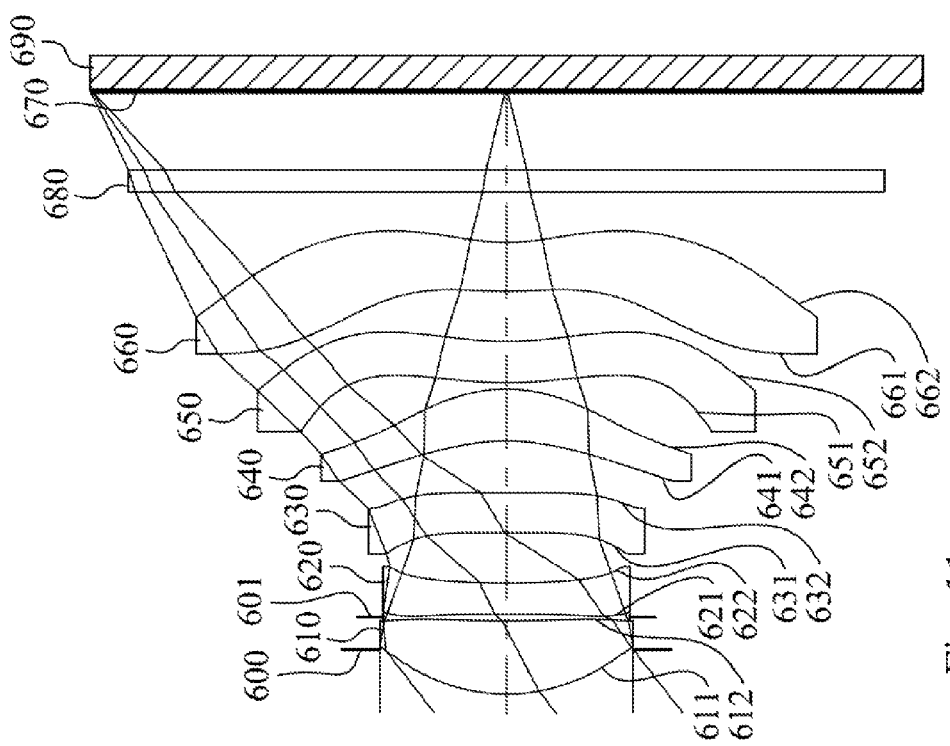
FIG. 11 is a schematic view of a photographing lens assembly according to the 6th embodiment of the present disclosure.
Figure 12:
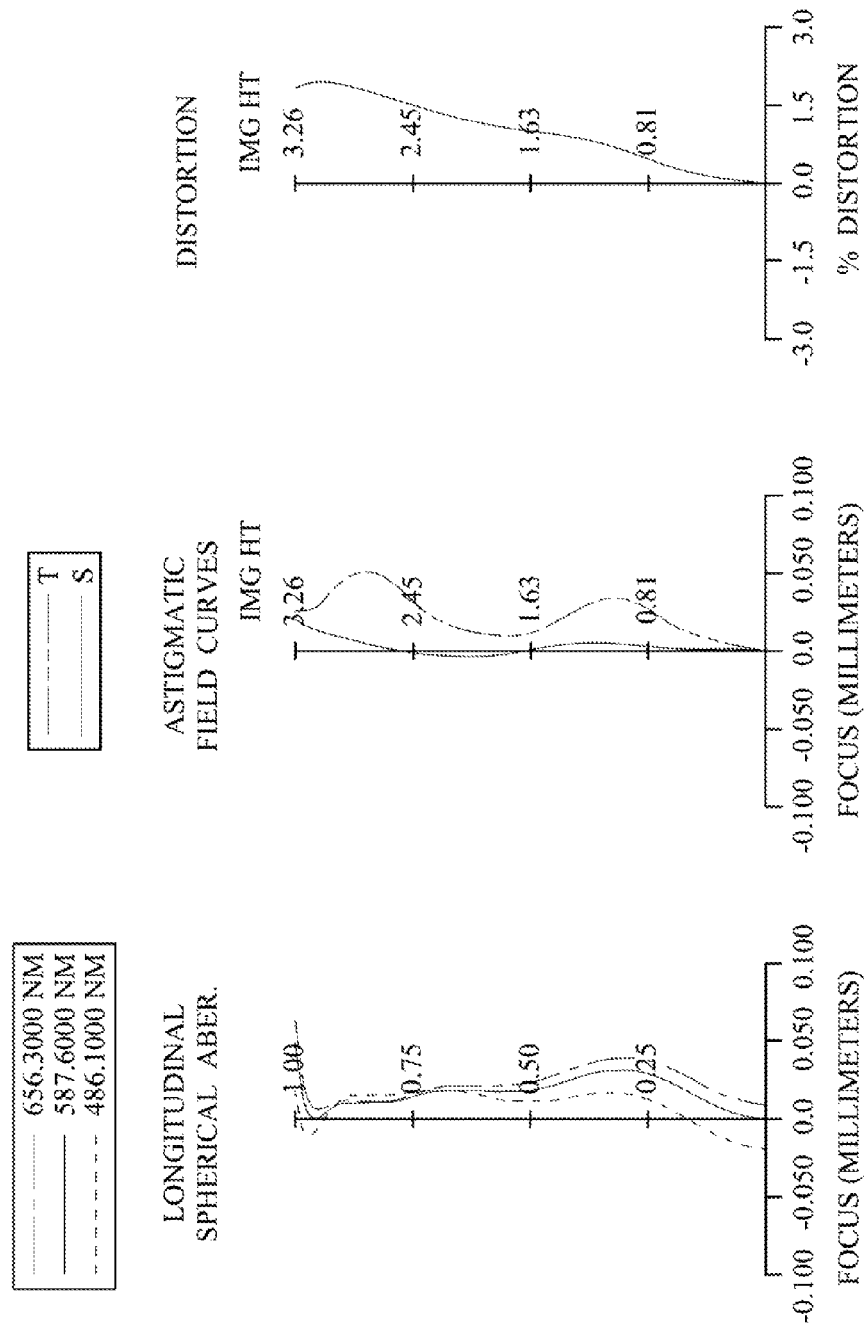
FIG. 12 shows spherical aberration curves, astigmatic field curves and a distortion curve of the photographing lens assembly according to the 6th embodiment.

FIG. 11 is a schematic view of a photographing lens assembly according to the 6th embodiment of the present disclosure. FIG. 12 shows spherical aberration curves, astigmatic field curves and a distortion curve of the photographing lens assembly according to the 6th embodiment. In FIG. 11, the photographing lens assembly includes, in order from an object side to an image side, an aperture stop 600, a first lens element 610, a stop 601, a second lens 5i element 620, a third lens element 630, a fourth lens element 640, a fifth lens element 650, a sixth lens element 660, an IR-cut filter 680, an image plane 670 and an image sensor 690. The photographing lens assembly has a total of six lens elements with refractive power.

The first lens element 610 with positive refractive power has a convex object-side surface 611 and a concave image-side surface 612. The first lens element 610 is made of plastic material and has the object-side surface 611 and the image-side surface 612 being aspheric.

The second lens element 620 with negative refractive power has a concave object-side surface 621 and a concave image-side surface 622. The second lens element 620 is made of plastic material and has the object-side surface 621 and the image-side surface 622 being aspheric.

The third lens element 630 with negative refractive power has a convex object-side surface 631 and a concave image-side surface 632. The third lens element 630 is made of plastic material and has the object-side surface 631 and the image-side surface 632 being aspheric.

The fourth lens element 640 with positive refractive power has a concave object-side surface 641 and a convex image-side surface 642. The fourth lens element 640 is made of plastic material and has the object-side surface 641 and the image-side surface 642 being aspheric.

The fifth lens element 650 with negative refractive power has a convex object-side surface 651 and a concave image-side surface 652, wherein the object-side surface 651 of the fifth lens element 650 changes from convex at a paraxial region thereof to concave at a peripheral region thereof, and the image-side surface 652 of the fifth lens element 650 changes from concave at a paraxial region thereof to convex at a peripheral region thereof. Furthermore, both of the object-side surface 651 and the image-side surface 652 of the fifth lens element 650 have at least one inflection point. The fifth lens element 650 is made of plastic material and has the object-side surface 651 and the image-side surface 652 being aspheric.

The sixth lens element 660 with negative refractive power has a convex object-side surface 661 and a concave image-side surface 662, wherein the object-side surface 661 of the sixth lens element 660 is convex at a paraxial region thereof and comprises two inflection points between the paraxial region thereof and a peripheral region thereof. Furthermore, both of the object-side surface 661 and the image-side surface 662 of the sixth lens element 660 have at least one inflection point. The sixth lens element 660 is made of plastic material and has the object-side surface 661 and the image-side surface 662 being aspheric.

A projection point P1 of a maximum effective diameter position on the image-side surface 662 of the sixth lens element 660 onto an optical axis is closer to an imaged object than an axial vertex P2 on the object-side surface 661 of the sixth lens element 660. Please refer to FIG. 21 (exemplary figure), the exemplary figure for the sixth embodiment will not otherwise be provided herein.

The IR-cut filter 680 is made of glass, and located between the sixth lens element 660 and the image plane 670, and will not affect the focal length of the photographing lens assembly.

The detailed optical data of the 6th embodiment are shown in Table 11 and the aspheric surface data are shown in Table 12 below.

TABLE 11

6th Embodiment
f = 4.09 mm, Fno = 2.05, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.350 | | | | |
| 2 | Lens 1 | 1.455 | ASP | 0.577 | Plastic | 1.544 | 55.9 | 3.10 |
| 3 | | 9.020 | ASP | 0.028 | | | | |
| 4 | Stop | Plano | | 0.025 | | | | |
| 5 | Lens 2 | −19.098 | ASP | 0.240 | Plastic | 1.640 | 23.3 | −8.01 |
| 6 | | 7.040 | ASP | 0.399 | | | | |
| 7 | Lens 3 | 23.261 | ASP | 0.313 | Plastic | 1.640 | 23.3 | −390.82 |
| 8 | | 21.169 | ASP | 0.406 | | | | |
| 9 | Lens 4 | −1.704 | ASP | 0.412 | Plastic | 1.544 | 55.9 | 5.65 |
| 10 | | −1.190 | ASP | 0.050 | | | | |
| 11 | Lens 5 | 3.012 | ASP | 0.320 | Plastic | 1.640 | 23.3 | −21.23 |
| 12 | | 2.363 | ASP | 0.401 | | | | |
| 13 | Lens 6 | 3.534 | ASP | 0.380 | Plastic | 1.544 | 55.9 | −5.49 |
| 14 | | 1.557 | ASP | 0.400 | | | | |
| 15 | IR-cut filter | Plano | | 0.175 | Glass | 1.517 | 64.2 | — |
| 16 | | Plano | | 0.619 | | | | |
| 17 | Image | Plano | | — | | | | |

Note:
Reference wavelength (d-line) is 587.6 nm.
Half of the effective diameter of the stop at Surface 4 is 0.970 mm.

TABLE 12

Aspheric Coefficients

| Surface # | 2 | 3 | 5 | 6 | 7 | 8 |
|---|---|---|---|---|---|---|
| k = | 2.1067E−01 | −5.6569E+00 | −9.0000E+01 | −2.5675E+01 | −8.9994E+01 | −1.6435E+01 |
| A4 = | −1.6990E−02 | −7.7776E−02 | −7.3328E−02 | 5.2741E−04 | −2.3660E−01 | −1.4887E−01 |
| A6 = | 7.8771E−02 | −1.2742E−01 | −2.3323E−02 | 8.7884E−02 | 4.5042E−01 | 2.1562E−01 |
| A8 = | −2.4746E−01 | 6.7762E−01 | 7.5794E−01 | 1.7598E−01 | −2.5429E+00 | −8.7785E−01 |
| A10 = | 3.3585E−01 | −1.1106E+00 | −1.5114E+00 | −4.5486E−01 | 6.8301E+00 | 1.6806E+00 |
| A12 = | −1.9392E−01 | 8.0436E−01 | 1.2892E+00 | 3.5743E−01 | −1.0414E+01 | −1.8291E+00 |
| A14 = | | −2.3147E−01 | −3.8145E−01 | 8.2134E−04 | 8.2898E+00 | 1.0625E+00 |
| A16 = | | | | | −2.6002E+00 | −2.3565E−01 |

| Surface # | 9 | 10 | 11 | 12 | 13 | 14 |
|---|---|---|---|---|---|---|
| k = | −4.1629E+00 | −1.6790E+00 | −7.3615E+00 | −2.3154E+01 | −9.0000E+01 | −1.2489E+01 |
| A4 = | 3.8475E−03 | 2.5395E−02 | −1.0796E−01 | −5.8209E−02 | −2.8589E−01 | −1.6547E−01 |
| A6 = | 8.9230E−02 | −3.5194E−03 | 4.0729E−02 | −2.1011E−03 | 1.6516E−01 | 9.4166E−02 |
| A8 = | −1.0692E−01 | 4.9179E−03 | −3.2408E−02 | 9.1179E−03 | −5.7829E−02 | −4.0983E−02 |
| A10 = | 4.6517E−02 | 5.5155E−02 | 8.2337E−03 | −1.0066E−02 | 1.5191E−02 | 1.2568E−02 |
| A12 = | −6.4329E−03 | −5.4968E−02 | −5.9430E−04 | 4.5659E−03 | −2.7791E−03 | −2.4608E−03 |
| A14 = | | 1.9007E−02 | | −8.7087E−04 | 2.9787E−04 | 2.6734E−04 |
| A16 = | | −2.2980E−03 | | 5.8567E−05 | −1.3752E−05 | −1.2035E−05 |

In the photographing lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| f [mm] | 4.09 | f4/f6 | −1.03 |
|---|---|---|---|
| Fno | 2.05 | f6/f5 | 0.26 |
| HFOV [deg.] | 38.0 | f/f6 | −0.74 |
| (V2 + V3 + V5)/3 | 23.3 | SAG51/CT5 | −1.20 |
| T34/T23 | 1.02 | CRA [deg.] | 33.61 |
| T45/T56 | 0.12 | (TD/Y) + (BL/Y) | 1.46 |
| (R9 − R10)/(R9 + R10) | 0.12 | | |

7th Embodiment

Figure 13:
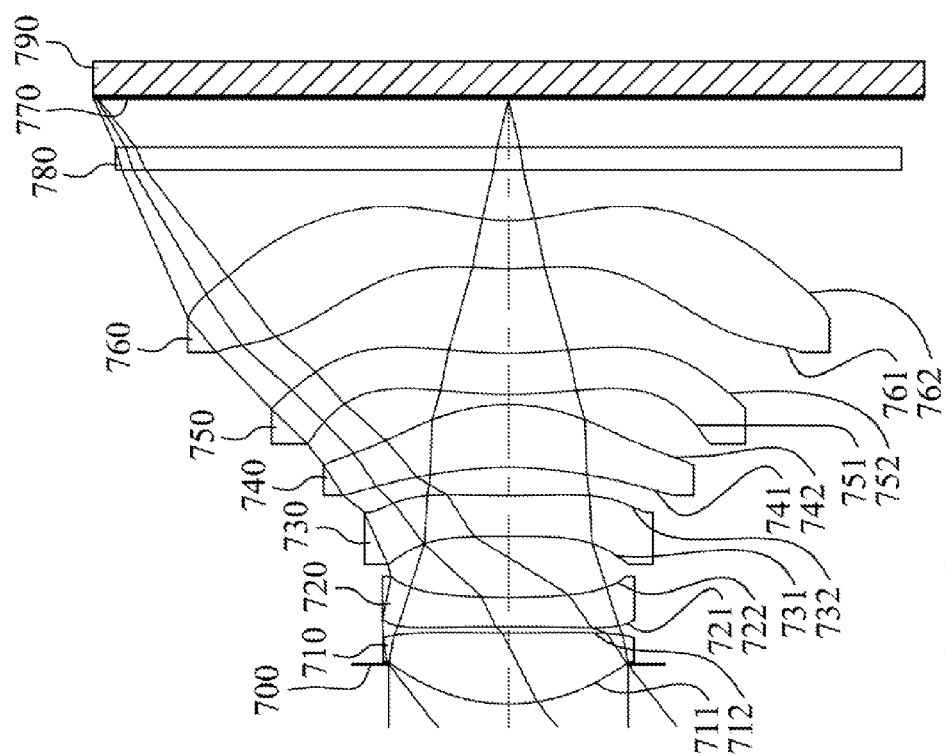
FIG. 13 is a schematic view of a photographing lens assembly according to the 7th embodiment of the present disclosure.
Figure 14:
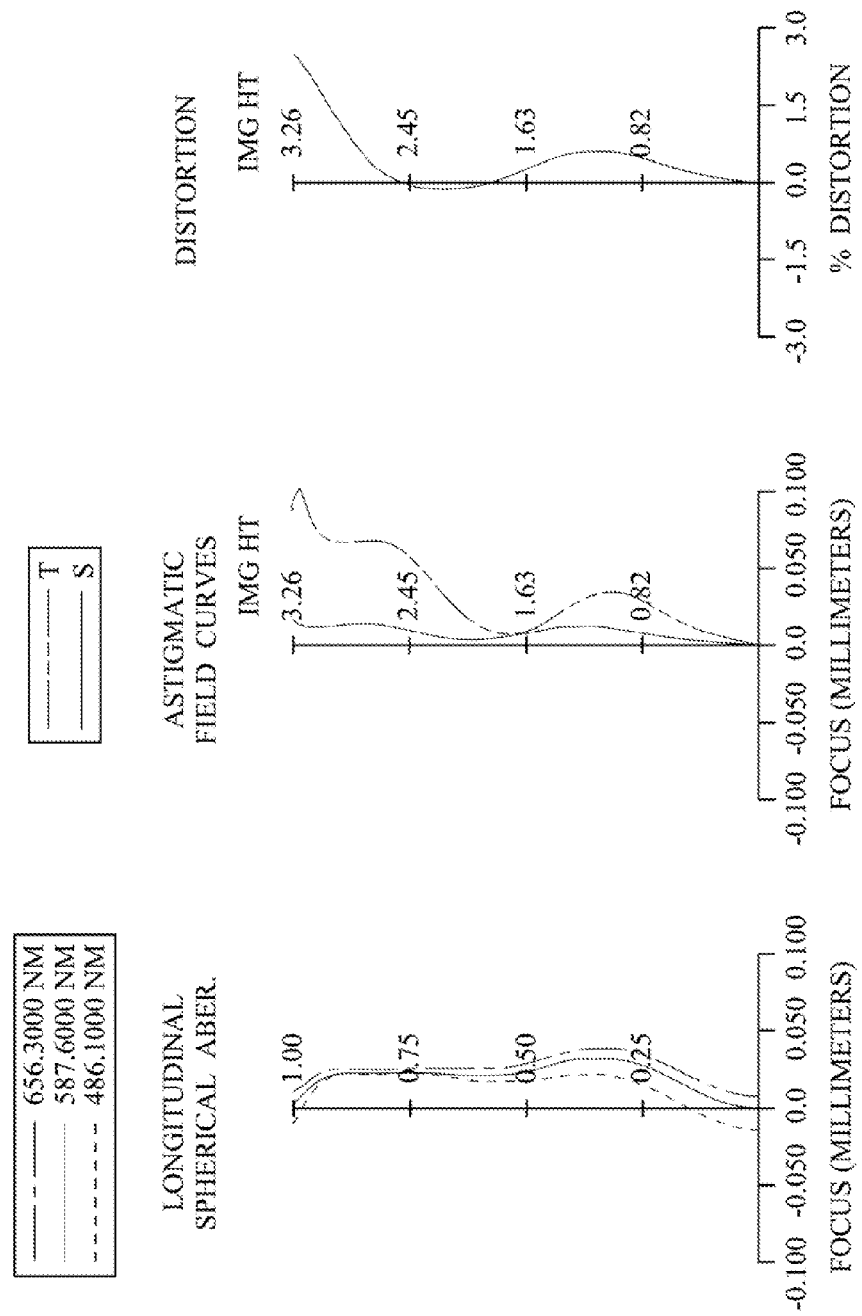
FIG. 14 shows spherical aberration curves, astigmatic field curves and a distortion curve of the photographing lens assembly according to the 7th embodiment.

FIG. 13 is a schematic view of a photographing lens assembly according to the 7th embodiment of the present disclosure. FIG. 14 shows spherical aberration curves, astigmatic field curves and a distortion curve of the photographing lens assembly according to the 7th embodiment. In FIG. 13, the photographing lens assembly includes, in order from an object side to an image side, an aperture stop 700, a first lens element 710, a second lens element 720, a third lens element 730, a fourth lens element 740, a fifth lens element 750, a sixth lens element 760, an IR-cut filter 780, an image plane 770 and an image sensor 790. The photographing lens assembly has a total of six lens elements with refractive power.

The first lens element 710 with positive refractive power has a convex object-side surface 711 and a concave image-side surface 712. The first lens element 710 is made of plastic material and has the object-side surface 711 and the image-side surface 712 being aspheric.

The second lens element 720 with negative refractive power has a concave object-side surface 721 and a concave image-side surface 722. The second lens element 720 is made of plastic material and has the object-side surface 721 and the image-side surface 722 being aspheric.

The third lens element 730 with negative refractive power has a concave object-side surface 731 and a concave image-side surface 732. The third lens element 730 is made of plastic material and has the object-side surface 731 and the image-side surface 732 being aspheric.

The fourth lens element 740 with positive refractive power has a concave object-side surface 741 and a convex image-side surface 742. The fourth lens element 740 is made of plastic material and has the object-side surface 741 and the image-side surface 742 being aspheric.

The fifth lens element 750 with negative refractive power has a convex object-side surface 751 and a concave image-side surface 752, wherein the object-side surface 751 of the fifth lens element 750 changes from convex at a paraxial region thereof to concave at a peripheral region thereof, and the image-side surface 752 of the fifth lens element 750 changes from concave at a paraxial region thereof to convex at a peripheral region thereof. Furthermore, both of the object-side surface 751 and the image-side surface 752 of the fifth lens element 750 have at least one inflection point. The fifth lens element 750 is made of plastic material and has the object-side surface 751 and the image-side surface 752 being aspheric.

The sixth lens element 760 with negative refractive power has a convex object-side surface 761 and a concave image-side surface 762, wherein the object-side surface 761 of the sixth lens element 760 is convex at a paraxial region thereof and comprises two inflection points between the paraxial region thereof and a peripheral region thereof. Furthermore, both of the object-side surface 761 and the image-side surface 762 of the sixth lens element 760 have at least one inflection point. The sixth lens element 760 is made of plastic material and has the object-side surface 761 and the image-side surface 762 being aspheric.

A projection point P1 of a maximum effective diameter position on the image-side surface 762 of the sixth lens element 760 onto an optical axis is closer to an imaged object than an axial vertex P2 on the object-side surface 761 of the sixth lens element 760. Please refer to FIG. 21 (exemplary figure), the exemplary figure for the seventh embodiment will not otherwise be provided herein.

The IR-cut filter 780 is made of glass, and located between the sixth lens element 760 and the image plane 770, and will not affect the focal length of the photographing lens assembly.

The detailed optical data of the 7th embodiment are shown in Table 13 and the aspheric surface data are shown in Table 14 below.

TABLE 13

7th Embodiment
f = 4.10 mm, Fno = 2.17, HFOV = 37.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.312 | | | | |
| 2 | Lens 1 | 1.476 | ASP | 0.561 | Plastic | 1.544 | 55.9 | 2.93 |
| 3 | | 17.478 | ASP | 0.050 | | | | |
| 4 | Lens 2 | −44.461 | ASP | 0.230 | Plastic | 1.614 | 25.6 | −7.98 |
| 5 | | 5.517 | ASP | 0.484 | | | | |
| 6 | Lens 3 | −29.812 | ASP | 0.323 | Plastic | 1.608 | 25.7 | −9.94 |
| 7 | | 7.608 | ASP | 0.219 | | | | |
| 8 | Lens 4 | −2.764 | ASP | 0.500 | Plastic | 1.544 | 55.9 | 4.99 |
| 9 | | −1.457 | ASP | 0.080 | | | | |
| 10 | Lens 5 | 3.431 | ASP | 0.320 | Plastic | 1.640 | 23.3 | −69.74 |
| 11 | | 3.070 | ASP | 0.674 | | | | |
| 12 | Lens 6 | 3.076 | ASP | 0.380 | Plastic | 1.535 | 55.7 | −4.87 |
| 13 | | 1.350 | ASP | 0.400 | | | | |
| 14 | IR-cut filter | Plano | | 0.175 | Glass | 1.517 | 64.2 | — |

TABLE 13-continued

7th Embodiment
f = 4.10 mm, Fno = 2.17, HFOV = 37.7 deg.

| Surface # | | Curvature Radius | Thickness | Material | Index | Abbe # | Focal Length |
|---|---|---|---|---|---|---|---|
| 15 | | Plano | 0.400 | | | | |
| 16 | Image | Plano | — | | | | |

Note:
Reference wavelength (d-line) is 587.6 nm.

TABLE 14

Aspheric Coefficients

| Surface # | 2 | 3 | 4 | 5 | 6 | 7 |
|---|---|---|---|---|---|---|
| k = | 1.4786E−01 | −7.0000E+01 | −4.5128E+01 | −3.9136E+00 | 2.0000E+01 | −1.0000E+00 |
| A4 = | −1.3679E−02 | −6.6839E−02 | −6.2028E−02 | 3.5691E−03 | −2.9785E−01 | −1.9066E−01 |
| A6 = | 7.1321E−02 | −1.1315E−01 | −2.6503E−02 | 7.7382E−02 | 4.8995E−01 | 2.3711E−01 |
| A8 = | −2.3298E−01 | 6.4821E−01 | 7.5810E−01 | 1.8037E−01 | −2.5480E+00 | −8.6882E−01 |
| A10 = | 3.1683E−01 | −1.1093E+00 | −1.5104E+00 | −4.3880E−01 | 6.8306E+00 | 1.6679E+00 |
| A12 = | −1.9389E−01 | 8.0440E−01 | 1.2893E+00 | 3.5743E−01 | −1.0414E+01 | −1.8386E+00 |
| A14 = | | −2.3146E−01 | −3.8140E−01 | 7.8605E−04 | 8.2898E+00 | 1.0625E+00 |
| A16 = | | | | | −2.6002E+00 | −2.3565E−01 |

| Surface # | 8 | 9 | 10 | 11 | 12 | 13 |
|---|---|---|---|---|---|---|
| k = | −1.4130E+01 | −1.1894E+00 | −8.8256E+00 | −3.5301E+01 | −5.9648E+01 | −9.5775E+00 |
| A4 = | −7.1184E−03 | 1.9567E−02 | −1.0963E−01 | −6.1061E−02 | −3.0290E−01 | −1.7194E−01 |
| A6 = | 7.1999E−02 | −5.7436E−03 | 4.1872E−02 | −3.7524E−03 | 1.6600E−01 | 9.3646E−02 |
| A8 = | −1.0762E−01 | 5.0723E−03 | −3.2353E−02 | 9.4533E−03 | −5.7537E−02 | −4.0783E−02 |
| A10 = | 4.9373E−02 | 5.5165E−03 | 7.8294E−03 | −1.0027E−02 | 1.5206E−02 | 1.2580E−02 |
| A12 = | −5.9465E−03 | −5.5016E−02 | −5.4094E−04 | 4.5615E−03 | −2.7784E−03 | −2.4611E−03 |
| A14 = | | 1.8930E−02 | | −8.7330E−04 | 2.9732E−04 | 2.6681E−04 |
| A16 = | | −2.2870E−03 | | 5.8399E−05 | −1.3907E−05 | −1.2028E−05 |

In the photographing lens assembly according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| f [mm] | 4.10 | f4/f6 | −1.03 |
|---|---|---|---|
| Fno | 2.17 | f6/f5 | 0.07 |
| HFOV [deg.] | 37.7 | f/f6 | −0.84 |
| (V2 + V3 + V5)/3 | 24.9 | SAG51/CT5 | −1.24 |
| T34/T23 | 0.45 | CRA [deg.] | 30.43 |
| T45/T56 | 0.12 | (TD/Y) + (BL/Y) | 1.47 |
| (R9 − R10)/(R9 + R10) | 0.06 | | |

8th Embodiment

Figure 15:
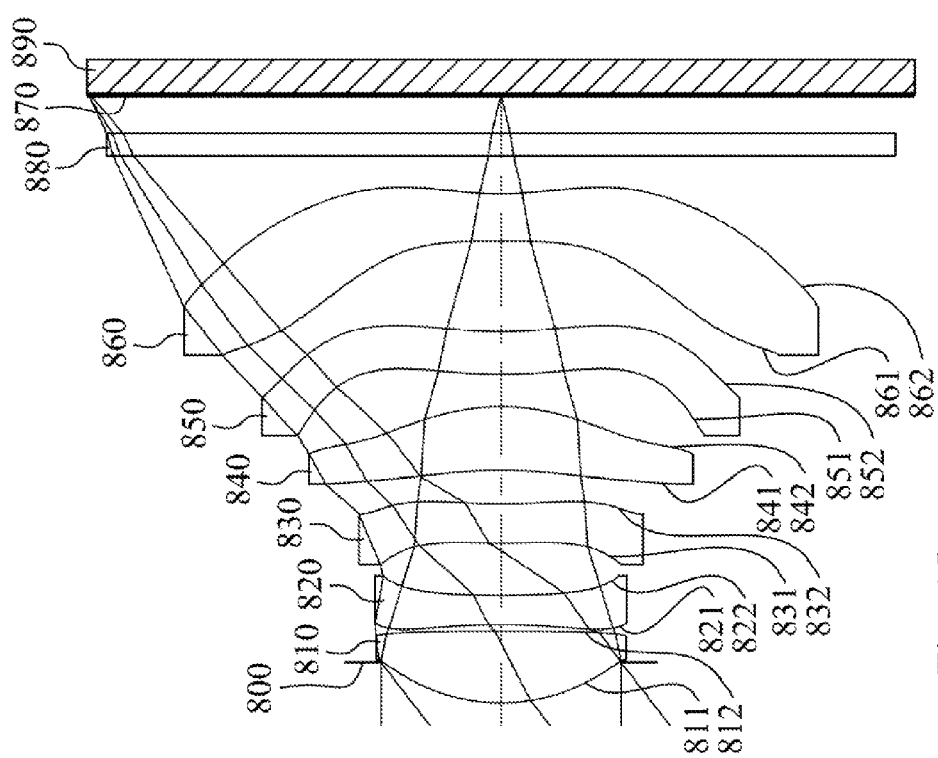
FIG. 15 is a schematic view of a photographing lens assembly according to the 8th embodiment of the present disclosure.
Figure 16:
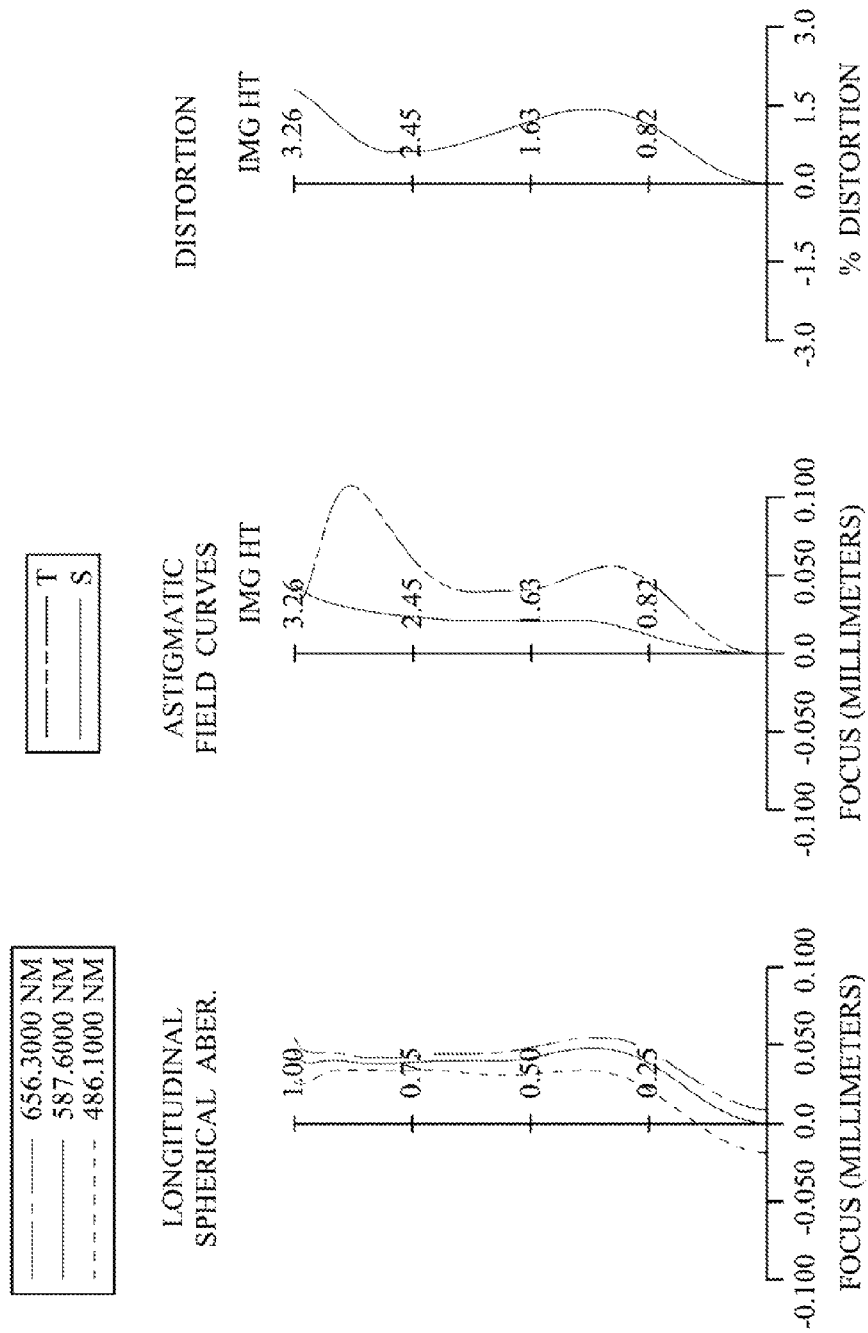
FIG. 16 shows spherical aberration curves, astigmatic field curves and a distortion curve of the photographing lens assembly according to the 8th embodiment.

FIG. 15 is a schematic view of a photographing lens assembly according to the 8th embodiment of the present disclosure. FIG. 16 shows spherical aberration curves, astigmatic field curves and a distortion curve of the photographing lens assembly according to the 8th embodiment. In FIG. 15, the photographing lens assembly includes, in order from an object side to an image side, an aperture stop 800, a first lens element 810, a second lens element 820, a third lens element 830, a fourth lens element 840, a fifth lens element 850, a sixth lens element 860, an IR-cut filter 880, an image plane 870 and an image sensor 890. The photographing lens assembly has a total of six lens elements with refractive power.

The first lens element 810 with positive refractive power has a convex object-side surface 811 and a convex image-side surface 812. The first lens element 810 is made of plastic material and has the object-side surface 811 and the image-side surface 812 being aspheric.

The second lens element 820 with negative refractive power has a concave object-side surface 821 and a concave image-side surface 822. The second lens element 820 is made of plastic material and has the object-side surface 821 and the image-side surface 822 being aspheric.

The third lens element 830 with negative refractive power has a convex object-side surface 831 and a concave image-side surface 832. The third lens element 830 is made of plastic material and has the object-side surface 831 and the image-side surface 832 being aspheric.

The fourth lens element 840 with positive refractive power has a concave object-side surface 841 and a convex image-side surface 842. The fourth lens element 840 is made of plastic material and has the object-side surface 841 and the image-side surface 842 being aspheric.

The fifth lens element 850 with negative refractive power has a convex object-side surface 851 and a concave image-side surface 852, wherein the object-side surface 851 of the fifth lens element 850 changes from convex at a lto paraxial region thereof to concave at a peripheral region thereof, and the image-side surface 852 of the fifth lens element 850 changes from concave at a paraxial region thereof to convex at a peripheral region thereof. Furthermore, both of the object-side surface 851 and the image-side surface 852 of the fifth lens element 850 have at least one inflection point. The fifth lens element 850 is made of plastic material and has the object-side surface 851 and the image-side surface 852 being aspheric.

The sixth lens element 860 with negative refractive power has a concave object-side surface 861 and a concave image-side surface 862. Furthermore, both of the object-side surface 861 and the image-side surface 862 of the sixth lens element 860 have at least one inflection point. The sixth lens element 860 is made of plastic material and has the object-side surface 861 and the image-side surface 862 being aspheric.

A projection point P1 of a maximum effective diameter position on the image-side surface 862 of the sixth lens element 860 onto an optical axis is closer to an imaged object than an axial vertex P2 on the object-side surface 861 of the sixth lens element 860. Please refer to FIG. 21 (exemplary figure), the exemplary figure for the eighth embodiment will not otherwise be provided herein.

The IR-cut filter 880 is made of glass, and located between the sixth lens element 860 and the image plane 870, and will not affect the focal length of the photographing lens assembly.

The detailed optical data of the 8th embodiment are shown in Table 15 and the aspheric surface data are shown in Table 16 below.

TABLE 15

8th Embodiment f = 4.11 mm, Fno = 2.17, HFOV = 37.7 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.320 |  |  |  |  |
| 2 | Lens 1 | 1.479 | ASP | 0.568 | Plastic | 1.544 | 55.9 | 2.70 |
| 3 |  | −155.451 | ASP | 0.050 |  |  |  |  |
| 4 | Lens 2 | −5.732 | ASP | 0.230 | Plastic | 1.583 | 30.2 | −5.48 |
| 5 |  | 7.331 | ASP | 0.415 |  |  |  |  |
| 6 | Lens 3 | 7.832 | ASP | 0.310 | Plastic | 1.608 | 25.7 | −19.78 |
| 7 |  | 4.672 | ASP | 0.262 |  |  |  |  |
| 8 | Lens 4 | −3.306 | ASP | 0.506 | Plastic | 1.544 | 55.9 | 5.71 |
| 9 |  | −1.687 | ASP | 0.254 |  |  |  |  |
| 10 | Lens 5 | 3.544 | ASP | 0.336 | Plastic | 1.640 | 23.3 | −61.70 |
| 11 |  | 3.132 | ASP | 0.711 |  |  |  |  |
| 12 | Lens 6 | −76.923 | ASP | 0.380 | Plastic | 1.535 | 55.7 | 4.51 |
| 13 |  | 2.494 | ASP | 0.300 |  |  |  |  |
| 14 | IR-cut filter | Plano |  | 0.175 | Glass | 1.517 | 64.2 | — |
| 15 |  | Plano |  | 0.306 |  |  |  |  |
| 16 | Image | Plano |  | — |  |  |  |  |

Note:
Reference wavelength (d-line) is 587.6 nm.

TABLE 16

Aspheric Coefficients

| Surface # | 2 | 3 | 4 | 5 | 6 | 7 |
|---|---|---|---|---|---|---|
| k = | 1.5957E−01 | −7.0000E+01 | −4.3029E+01 | 1.8994E+01 | −5.0000E+01 | −6.0758E+00 |
| A4 = | −1.2492E−02 | −5.3893E−02 | −4.7189E−02 | 1.8209E−02 | −3.0714E−01 | −1.8751E−01 |
| A6 = | 7.5892E−02 | −1.1668E−01 | −1.3121E−02 | 6.3942E−02 | 5.1234E−01 | 2.3529E−01 |
| A8 = | −2.3788E−01 | 6.8155E−01 | 7.3780E−01 | 1.8843E−01 | −2.5718E+00 | −8.6512E−01 |
| A10 = | 3.2550E−01 | −1.1202E+00 | −1.4996E+00 | −4.6378E−01 | 6.8270E+00 | 1.6704E+00 |
| A12 = | −1.9389E−01 | 8.0440E−01 | 1.2893E+00 | 3.5743E−01 | −1.0414E+01 | −1.8399E+00 |
| A14 = |  | −2.3146E−01 | −3.8140E−01 | 7.8604E−04 | 8.2898E+00 | 1.0625E+00 |
| A16 = |  |  |  |  | −2.6002E+00 | −2.3565E−01 |

| Surface # | 8 | 9 | 10 | 11 | 12 | 13 |
|---|---|---|---|---|---|---|
| k = | −2.2371E+01 | −1.4883E+00 | −7.2875E+00 | −3.0481E+01 | 1.0000E+00 | −1.2807E+01 |
| A4 = | 1.6088E−02 | 2.5735E−02 | −1.1653E−01 | −6.5131E−02 | −3.0570E−01 | −1.7512E−01 |
| A6 = | 8.2061E−02 | −6.4806E−03 | 4.1369E−02 | −4.4224E−03 | 1.6628E−01 | 9.4642E−02 |
| A8 = | −1.0619E−01 | 4.7927E−03 | −3.2604E−02 | 9.0529E−03 | −5.7380E−02 | −4.0636E−02 |
| A10 = | 4.7866E−02 | 5.5093E−02 | 7.3755E−03 | −1.0087E−02 | 1.5218E−02 | 1.2564E−02 |
| A12 = | −7.3709E−03 | −5.4965E−02 | −3.8128E−04 | 4.5557E−03 | −2.7788E−03 | −2.4670E−03 |
| A14 = |  | 1.8923E−02 |  | −8.7141E−04 | 2.9685E−04 | 2.6627E−04 |
| A16 = |  | −2.2967E−03 |  | 6.2085E−05 | −1.4076E−05 | −1.1880E−05 |

In the photographing lens assembly according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following relationships:

| f [mm] | 4.11 | f4/f6 | −1.27 |
|---|---|---|---|
| Fno | 2.17 | f6/f5 | 0.07 |
| HFOV [deg.] | 37.7 | f/f6 | −0.91 |
| (V2 + V3 + V5)/3 | 26.4 | SAG51/CT5 | −1.45 |
| T34/T23 | 0.63 | CRA [deg.] | 32.20 |
| T45/T56 | 0.36 | (TD/Y) + (BL/Y) | 1.47 |
| (R9 − R10)/(R9 + R10) | 0.06 | | |

9th Embodiment

Figure 17:
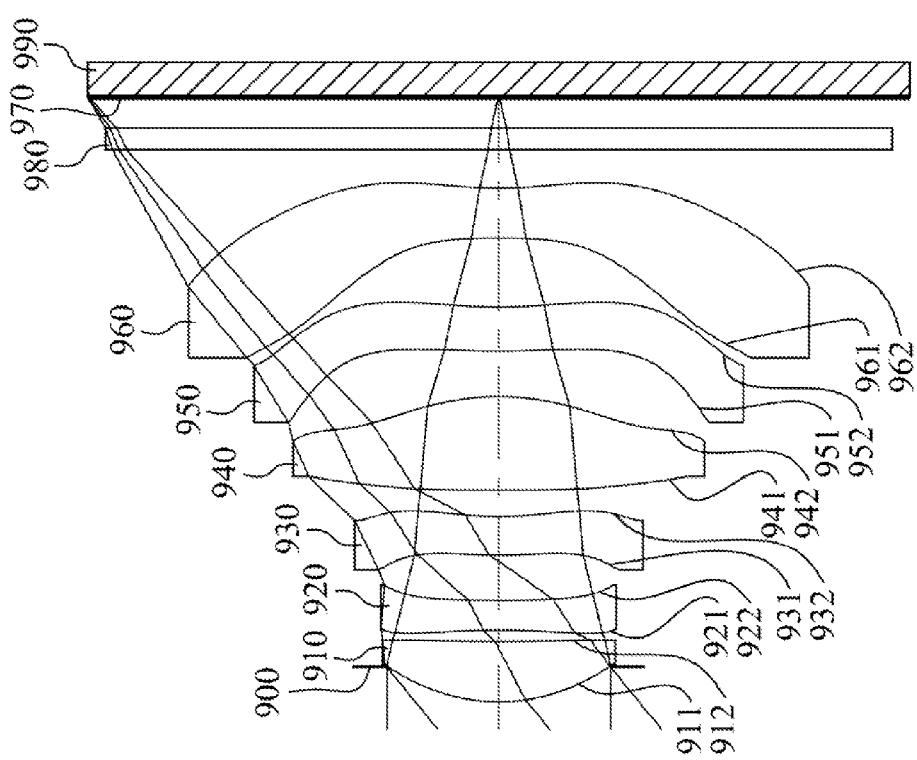
FIG. 17 is a schematic view of a photographing lens assembly according to the 9th embodiment of the present disclosure.
Figure 18:
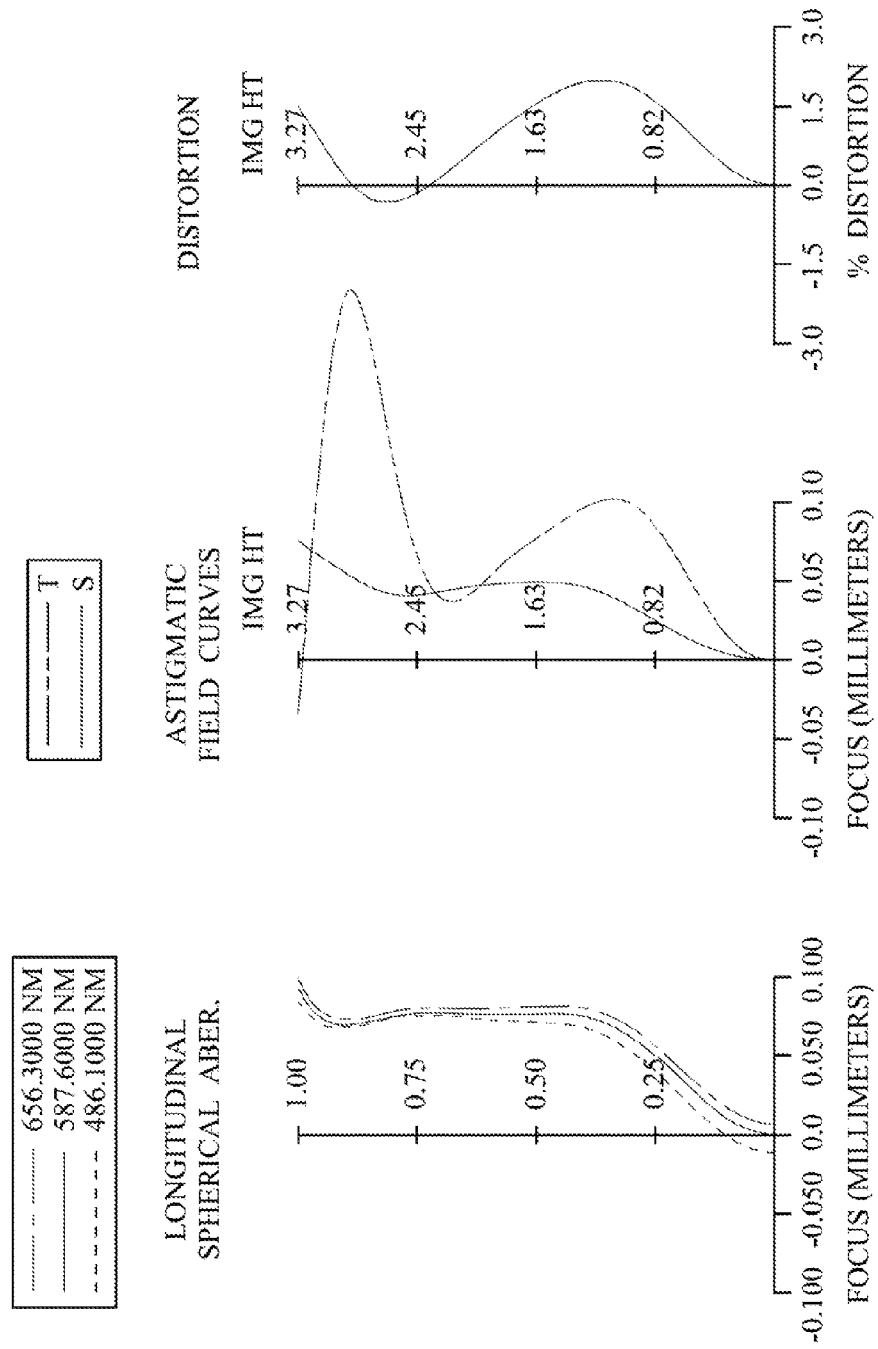
FIG. 18 shows spherical aberration curves, astigmatic field curves and a distortion curve of the photographing lens assembly according to the 9th embodiment.

FIG. 17 is a schematic view of a photographing lens assembly according to the 9th embodiment of the present disclosure. FIG. 18 shows spherical aberration curves, astigmatic field curves and a distortion curve of the photographing lens assembly according to the 9th embodiment. In FIG. 17, the photographing lens assembly includes, in order from an object side to an image side, an aperture stop 900, a first lens element 910, a second lens element 920, a third lens element 930, a fourth lens element 940, a fifth lens element 950, a sixth lens element 960, an IR-cut filter 980, an image plane 970 and an image sensor 990. The photographing lens assembly has a total of six lens elements with refractive power.

The first lens element 910 with positive refractive power has a convex object-side surface 911 and a concave image-side surface 912. The first lens element 910 is made of plastic material and has the object-side surface 911 and the image-side surface 912 being aspheric.

The second lens element 920 with negative refractive power has a concave object-side surface 921 and a concave image-side surface 922. The second lens element 920 is made of plastic material and has the object-side surface 921 and the image-side surface 922 being aspheric.

The third lens element 930 with negative refractive power has a convex object-side surface 931 and a concave image-side surface 932. The third lens element 930 is made of plastic material and has the object-side surface 931 and the image-side surface 932 being aspheric.

The fourth lens element 940 with positive refractive power has a convex object-side surface 941 and a convex image-side surface 942. The fourth lens element 940 is made of plastic material and has the object-side surface 941 and the image-side surface 942 being aspheric.

The fifth lens element 950 with negative refractive power has a convex object-side surface 951 and a concave image-side surface 952, wherein the object-side surface 951 of the fifth lens element 950 changes from convex at a paraxial region thereof to concave at a peripheral region thereof, and the image-side surface 952 of the fifth lens element 950 changes from concave at a paraxial region thereof to convex at a peripheral region thereof. Furthermore, both of the object-side surface 951 and the image-side surface 952 of the fifth lens element 950 have at least one inflection point. The fifth lens element 950 is made of plastic material and has the object-side surface 951 and the image-side surface 952 being aspheric.

The sixth lens element 960 with negative refractive power has a concave object-side surface 961 and a concave image-side surface 962. Furthermore, both of the object-side surface 961 and the image-side surface 962 of the sixth lens element 960 have at least one inflection point. The sixth lens element 960 is made of plastic material and has the object-side surface 961 and the image-side surface 962 being aspheric.

A projection point P1 of a maximum effective diameter position on the image-side surface 962 of the sixth lens element 960 onto an optical axis is closer to an imaged object than an axial vertex P2 on the object-side surface 961 of the sixth lens element 960. Please refer to FIG. 21 (exemplary figure), the exemplary figure for the ninth embodiment will not otherwise be provided herein.

The IR-cut filter 980 is made of glass, and located between the sixth lens element 960 and the image plane 970, and will not affect the focal length of the photographing lens assembly.

The detailed optical data of the 9th embodiment are shown in Table 17 and the aspheric surface data are shown in Table 18 below.

TABLE 17

9th Embodiment
f = 3.91 mm, Fno = 2.20, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.277 | | | | |
| 2 | Lens 1 | 1.493 | ASP | 0.479 | Plastic | 1.544 | 55.9 | 3.07 |
| 3 | | 12.347 | ASP | 0.090 | | | | |
| 4 | Lens 2 | −6.695 | ASP | 0.235 | Plastic | 1.607 | 26.6 | −6.71 |
| 5 | | 10.538 | ASP | 0.357 | | | | |
| 6 | Lens 3 | 3.917 | ASP | 0.311 | Plastic | 1.583 | 30.2 | −14.26 |
| 7 | | 2.585 | ASP | 0.210 | | | | |
| 8 | Lens 4 | 83.333 | ASP | 0.742 | Plastic | 1.544 | 55.9 | 3.62 |
| 9 | | −2.009 | ASP | 0.358 | | | | |
| 10 | Lens 5 | 6.442 | ASP | 0.354 | Plastic | 1.633 | 23.4 | −14.20 |
| 11 | | 3.672 | ASP | 0.544 | | | | |
| 12 | Lens 6 | −8.818 | ASP | 0.400 | Plastic | 1.535 | 55.7 | −4.12 |
| 13 | | 2.983 | ASP | 0.300 | | | | |
| 14 | IR-cut filter | Plano | | 0.175 | Glass | 1.517 | 64.2 | — |
| 15 | | Plano | | 0.247 | | | | |
| 16 | Image | Plano | | — | | | | |

Note:
Reference wavelength (d-line) is 587.6 nm.

TABLE 18

Aspheric Coefficients

| Surface # | 2 | 3 | 4 | 5 | 6 | 7 |
|---|---|---|---|---|---|---|
| k = | 1.4770E−01 | 1.3433E+01 | −5.9739E+01 | 3.3474E+01 | −3.3645E+01 | −9.7398E+00 |
| A4 = | −1.5325E−02 | −4.3799E−02 | −3.0456E−02 | 1.7778E−02 | −2.9562E−01 | −1.8707E−01 |
| A6 = | 7.8694E−02 | −1.4478E−01 | −7.7719E−03 | 8.8082E−02 | 5.3532E−01 | 2.4762E−01 |
| A8 = | −2.4302E−01 | 6.8445E−02 | 7.1369E−01 | 2.0501E−01 | −2.5669E+00 | −8.6361E−01 |
| A10 = | 3.2890E−01 | −1.1024E+00 | −1.4779E+00 | −4.8811E−01 | 6.8118E+00 | 1.6646E+00 |
| A12 = | −1.9405E−01 | 8.0414E−01 | 1.2890E+00 | 3.5676E−01 | −1.0414E+01 | −1.8457E+00 |
| A14 = | | −2.3146E−01 | −3.8140E−01 | 7.8220E−04 | 8.2898E+00 | 1.0625E+00 |
| A16 = | | | | | −2.6002E+00 | −2.3561E−01 |

| Surface # | 8 | 9 | 10 | 11 | 12 | 13 |
|---|---|---|---|---|---|---|
| k = | −6.0000E+01 | −1.0610E+00 | −4.7989E+00 | −5.0293E+01 | −3.8905E+00 | −8.5047E+00 |
| A4 = | 1.7382E−02 | 2.1469E−02 | −1.1068E−01 | −5.6704E−02 | −3.0716E−01 | −1.7772E−01 |
| A6 = | 8.1688E−02 | −3.8834E−03 | 4.4630E−02 | −4.0056E−03 | 1.6785E−01 | 9.5047E−02 |
| A8 = | −1.0614E−01 | 5.1132E−03 | −3.2435E−02 | 8.9877E−03 | −5.7073E−02 | −4.0463E−02 |
| A10 = | 4.7890E−02 | 5.5093E−02 | 7.2830E−03 | −1.0115E−02 | 1.5238E−02 | 1.2562E−02 |
| A12 = | −7.4604E−03 | −5.4962E−02 | −3.0909E−04 | 4.5519E−03 | −2.7835E−03 | −2.4710E−03 |
| A14 = | | 1.8930E−02 | | −8.7064E−04 | 2.9442E−04 | 2.6598E−04 |
| A16 = | | −2.2901E−03 | | 6.3280E−05 | −1.4911E−05 | −1.1842E−05 |

In the photographing lens assembly according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following relationships:

| f [mm] | 3.91 | f4/f6 | −0.88 |
|---|---|---|---|
| Fno | 2.20 | f6/f5 | 0.29 |
| HFOV [deg.] | 39.0 | f/f6 | −0.95 |
| (V2 + V3 + V5)/3 | 26.7 | SAG51/CT5 | −1.60 |
| T34/T23 | 0.59 | CRA [deg.] | 35.25 |
| T45/T56 | 0.66 | (TD/Y) + (BL/Y) | 1.47 |
| (R9 − R10)/(R9 + R10) | 0.27 | | |

10th Embodiment

Figure 19:
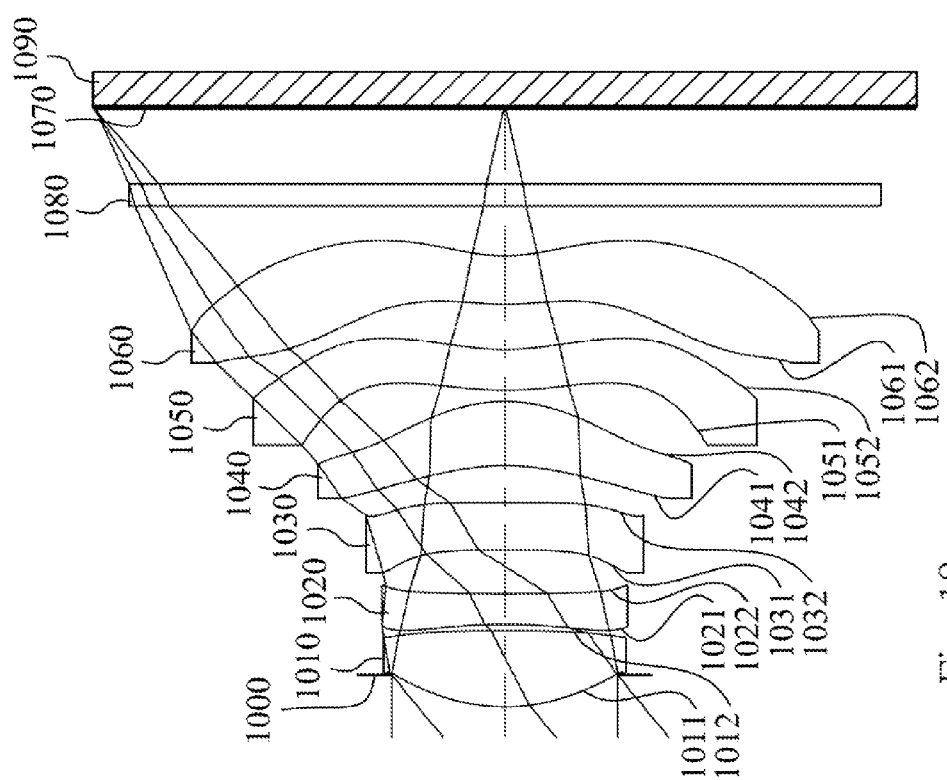
FIG. 19 is a schematic view of a photographing lens assembly according to the 10th embodiment of the present disclosure.
Figure 20:
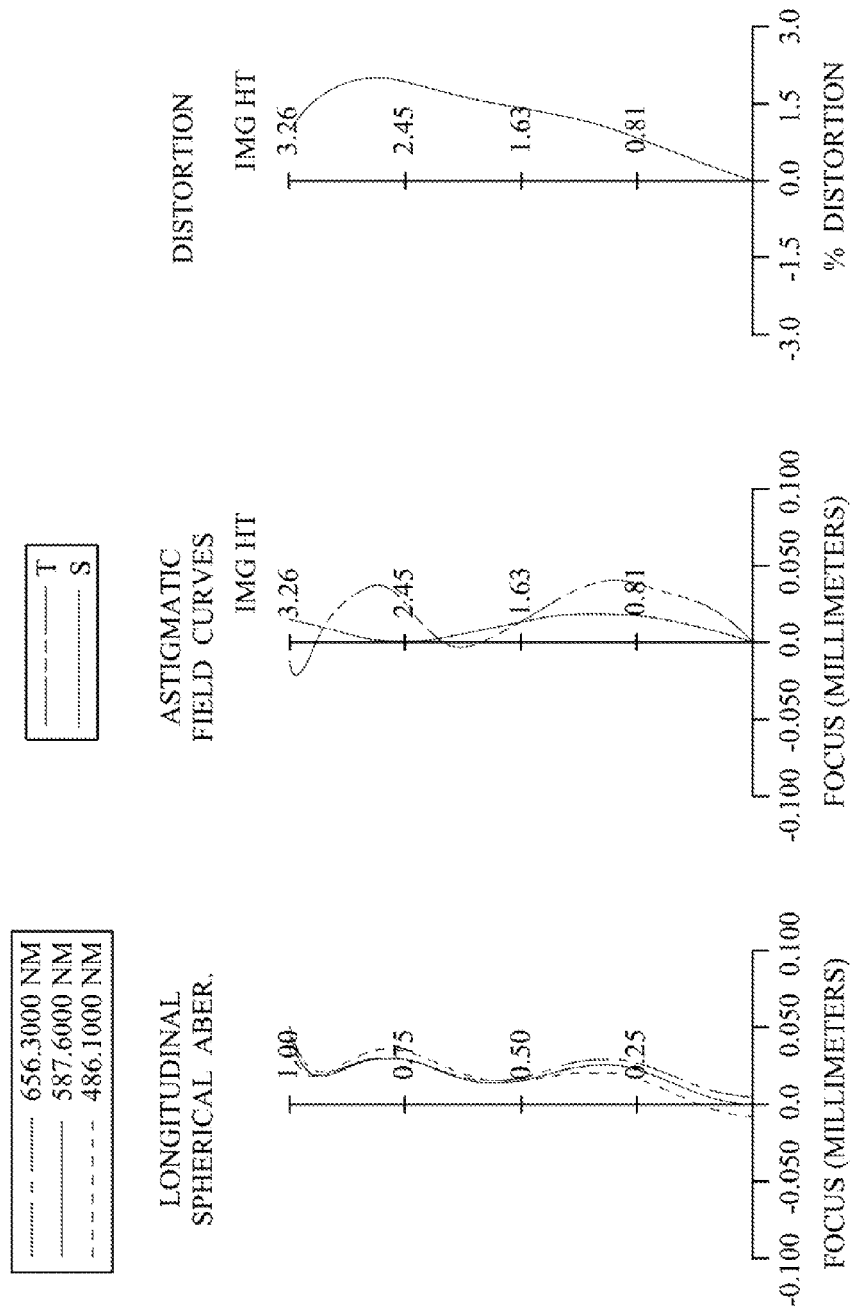
FIG. 20 shows spherical aberration curves, astigmatic field curves and a distortion curve of the photographing lens assembly according to the 10th embodiment.

FIG. 19 is a schematic view of a photographing lens assembly according to the 10th embodiment of the present disclosure. FIG. 20 shows spherical aberration curves, astigmatic field curves and a distortion curve of the photographing lens assembly according to the 10th embodiment. In FIG. 19, the photographing lens assembly includes, in order from an object side to an image side, an aperture stop 1000, a first lens element 1010, a second lens element 1020, a third lens element 1030, a fourth lens element 1040, a fifth lens element 1050, a sixth lens element 1060, an IR-cut filter 1080, an image plane 1070 and an image sensor 1090. The photographing lens assembly has a total of six lens elements with refractive power.

The first lens element 1010 with positive refractive power has a convex object-side surface 1011 and a convex image-side surface 1012. The first lens element 1010 is made of plastic material and has the object-side surface 1011 and the image-side surface 1012 being aspheric.

The second lens element 1020 with negative refractive power has a concave object-side surface 1021 and a concave image-side surface 1022. The second lens element 1020 is made of plastic material and has the object-side surface 1021 and the image-side surface 1022 being aspheric.

The third lens element 1030 with negative refractive power has a convex object-side surface 1031 and a concave image-side surface 1032. The third lens element 1030 is made of plastic material and has the object-side surface 1031 and the image-side surface 1032 being aspheric.

The fourth lens element 1040 with positive refractive power has a concave object-side surface 1041 and a convex image-side surface 1042. The fourth lens element 1040 is made of plastic material and has the object-side surface 1041 and the image-side surface 1042 being aspheric.

The fifth lens element 1050 with negative refractive power has a convex object-side surface 1051 and a concave image-side surface 1052, wherein the object-side surface 1051 of the fifth lens element 1050 changes from convex at a paraxial region thereof to concave at a peripheral region thereof, and the image-side surface 1052 of the fifth lens element 1050 changes from concave at a paraxial region thereof to convex at a peripheral region thereof. Furthermore, both of the object-side surface 1051 and the image-side surface 1052 of the fifth lens element 1050 have at least one inflection point. The fifth lens element 1050 is made of plastic material and has the object-side surface 1051 and the image-side surface 1052 being aspheric.

The sixth lens element 1060 with negative refractive power has a convex object-side surface 1061 and a concave image-side surface 1062, wherein the object-side surface 1061 of the sixth lens element 1060 is convex at a paraxial region thereof and comprises two inflection points between the paraxial region thereof and a peripheral region thereof. Furthermore, both of the object-side surface 1061 and the image-side surface 1062 of the sixth lens element 1060 have at least one inflection point. The sixth lens element 1060 is made of plastic material and has the object-side surface 1061 and the image-side surface 1062 being aspheric.

A projection point P1 of a maximum effective diameter position on the image-side surface 1062 of the sixth lens element 1060 onto an optical axis is closer to an imaged object than an axial vertex P2 on the object-side surface 1061 of the sixth lens element 1060. Please refer to FIG. 21 (exemplary figure), the exemplary figure for the tenth embodiment will not otherwise be provided herein.

The IR-cut filter 1080 is made of glass, and located between the sixth lens element 1060 and the image plane 1070, and will not affect the focal length of the photographing lens assembly.

The detailed optical data of the 10th embodiment are shown in Table 19 and the aspheric surface data are shown in Table 20 below.

TABLE 19

10th Embodiment
f = 3.94 mm, Fno = 2.20, HFOV = 39.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.250 | | | | |
| 2 | Lens 1 | 1.566 | ASP | 0.603 | Plastic | 1.544 | 55.9 | 2.72 |
| 3 | | −23.142 | ASP | 0.050 | | | | |
| 4 | Lens 2 | −4.628 | ASP | 0.240 | Plastic | 1.640 | 23.3 | −6.29 |
| 5 | | 31.447 | ASP | 0.348 | | | | |
| 6 | Lens 3 | 66.021 | ASP | 0.377 | Plastic | 1.640 | 23.3 | −126.21 |
| 7 | | 36.242 | ASP | 0.290 | | | | |
| 8 | Lens 4 | −1.853 | ASP | 0.513 | Plastic | 1.544 | 55.9 | 5.42 |
| 9 | | −1.249 | ASP | 0.089 | | | | |
| 10 | Lens 5 | 2.749 | ASP | 0.320 | Plastic | 1.640 | 23.3 | −13.44 |
| 11 | | 1.988 | ASP | 0.361 | | | | |
| 12 | Lens 6 | 2.268 | ASP | 0.380 | Plastic | 1.535 | 55.7 | −6.02 |
| 13 | | 1.253 | ASP | 0.400 | | | | |
| 14 | IR-cut filter | Plano | | 0.175 | Glass | 1.517 | 64.2 | — |
| 15 | | Plano | | 0.608 | | | | |
| 16 | Image | Plano | | — | | | | |

Note:
Reference wavelength (d-line) is 587.6 nm.

TABLE 20

Aspheric Coefficients

| Surface # | 2 | 3 | 4 | 5 | 6 | 7 |
|---|---|---|---|---|---|---|
| k = | 1.5259E−01 | −7.0000E+01 | −3.9805E+01 | −8.7683E+00 | −5.0000E+01 | −4.3576E+01 |
| A4 = | −1.9383E−02 | −6.4641E−02 | −6.3114E−02 | −1.0895E−02 | −2.6624E−01 | −1.4510E−01 |
| A6 = | 7.1882E−02 | −1.2497E−01 | −8.3987E−03 | 6.2270E−02 | 4.7227E−01 | 2.2437E−01 |
| A8 = | −2.6180E−01 | 6.7565E−01 | 7.4955E−01 | 1.9392E−01 | −2.5723E+00 | −8.7050E−01 |
| A10 = | 3.3773E−01 | −1.1061E+00 | −1.5074E+00 | −5.1980E−01 | 6.8765E+00 | 1.6778E+00 |
| A12 = | −1.9383E−01 | 8.0537E−01 | 1.2895E+00 | 3.4634E−01 | −1.0396E+01 | −1.8258E+00 |
| A14 = | | −2.3117E−01 | −3.8168E−01 | 1.6287E−02 | 8.2775E+00 | 1.0632E+00 |
| A16 = | | | | | −2.6001E+00 | −2.3834E−01 |

| Surface # | 8 | 9 | 10 | 11 | 12 | 13 |
|---|---|---|---|---|---|---|
| k = | −6.0522E+00 | −1.4965E+00 | −9.7604E+00 | −1.5705E+01 | −4.0875E+01 | −9.6655E+00 |
| A4 = | 5.7620E−03 | 2.9591E−02 | −1.1843E−01 | −7.2056E−02 | −2.8788E−01 | −1.6534E−01 |
| A6 = | 8.5144E−02 | −5.3307E−03 | 3.7823E−02 | −5.0018E−04 | 1.6525E−01 | 9.4567E−02 |
| A8 = | −1.0764E−01 | 5.1240E−02 | −3.1114E−02 | 9.6109E−03 | −5.7811E−02 | −4.0919E−02 |
| A10 = | 4.6849E−02 | 5.5027E−02 | 8.2675E−03 | −1.0052E−02 | 1.5191E−02 | 1.2563E−02 |
| A12 = | −5.7296E−03 | −5.5038E−02 | −5.9937E−04 | 4.5596E−03 | −2.7787E−03 | −2.4633E−03 |
| A14 = | | 1.8994E−02 | | −8.7238E−04 | 2.9782E−04 | 2.6702E−04 |
| A16 = | | −2.3318E−03 | | 5.8570E−05 | −1.3839E−05 | −1.2022E−05 |

In the photographing lens assembly according to the 10th embodiment, the definitions of these parameters shown in the following table are the same as those stated in the 1st embodiment with corresponding values for the 10th embodiment. Moreover, these parameters can be calculated from Table 19 and Table 20 as the following values and satisfy the following relationships:

| f [mm] | 3.94 | f4/f6 | −0.90 |
|---|---|---|---|
| Fno | 2.20 | f6/f5 | 0.45 |
| HFOV [deg.] | 39.3 | f/f6 | −0.65 |
| (V2 + V3 + V5)/3 | 23.3 | SAG51/CT5 | −1.36 |
| T34/T23 | 0.83 | CRA [deg.] | 32.13 |
| T45/T56 | 0.25 | (TD/Y) + (BL/Y) | 1.46 |
| (R9 − R10)/(R9 + R10) | 0.16 | | |

It is to be noted that TABLES 1-20 show different data of the different embodiments; however, the data of the different embodiments are obtained from experiments. Therefore, any imaging lens system of the same structure is considered to be less than or equal to the scope of the present disclosure even if it uses different data. The embodiments depicted above and the appended drawings are exemplary and are not intended to limit the scope of the present disclosure.

What is claimed is:

1. A photographing lens assembly comprising, in order from an object side to an image side:
   a first lens element with positive refractive power having a convex object-side surface;
   a second lens element having refractive power;
   a third lens element having refractive power;
   a fourth lens element having refractive power;
   a fifth lens element with negative refractive power having a convex object-side surface and a concave image-side surface, wherein the object-side surface and the image-side surface of the fifth lens element are aspheric and the fifth lens element has at least one inflection point on at least one of the object-side surface and the image-side surface thereof; and a sixth lens element with negative refractive power having a convex object-side surface and a concave image-side surface, wherein the object-side surface and the image-side surface of the sixth lens element are aspheric, and the sixth lens element has at least one inflection point on at least one of the object-side surface and the image-side surface thereof;

wherein the photographing lens assembly has a total of six lens elements with refractive power, each of the first lens element, the second lens element, the third lens element, the fourth lens element, the fifth lens element and the sixth lens element a single and non-cemented lens element, a focal length of the fifth lens element is f5, a focal length of the sixth lens element is f6, an axial distance between the second lens element and the third lens element is T23, an axial distance between the third lens element and the fourth lens element T34, and the following relationships are satisfied:

$0 < f6/f5 < 1.2$; and $0.5 < T34/T23 < 1.7$.

2. The photographing lens assembly of claim 1, wherein the second lens element has negative refractive power.

3. The photographing lens assembly of claim 1, wherein the fourth lens element has a convex image-side surface.

4. The photographing lens assembly of claim 1, wherein the fourth lens element has a concave object-side surface.

5. The photographing lens assembly of claim 1, wherein the first lens element has a concave image-side surface.

6. The photographing lens assembly of claim 1, wherein the third lens element has positive refractive power.

7. The photographing lens assembly of claim 1, wherein the second lens element has a convex object-side surface.

8. The photographing lens assembly of claim 1, wherein the third lens element has a convex object-side surface.

9. The photographing lens assembly of claim 1, wherein the third lens element has a convex image-side surface.

10. The photographing lens assembly of claim 1, wherein an f-number of the photographing lens assembly is Fno, and the following relationship is satisfied:

$1.2 < Fno \leq 2.17$.

11. The photographing lens assembly of claim 1, wherein an Abbe number of the second lens element is V2, an Abbe number of he third lens element is V3, an Abbe number of the fifth lens element is V5, and the following relationship is satisfied:

$15 < (V2+V3+V5)/3 < 30$.

12. The photographing lens assembly of claim 1, wherein a curvature radius of the object-side surface of the fifth lens element is R9, curvature radius of the image-side surface of the fifth lens element is R10, and the following relationship is satisfied:

$0 < (R9-R10)/(R9+R10) < 0.4$.

13. The photographing lens assembly of claim 12, wherein the curvature radius of the object-side surface of the fifth lens element is R9, the curvature radius of the image-side surface of the fifth lens element is R10, and the following relationship is satisfied:

$0 < (R9-R10)/(R9+R10) \leq 0.19$.

14. The photographing lens assembly of claim 1, wherein an axial distance between the fourth lens element and the fifth lens element is T45, an axial distance between the fifth lens element and the sixth lens element is T56, and the following relationship is satisfied:

$0 < T45/T56 < 0.27$.

15. The photographing lens assembly of claim 1, wherein a projection point a maximum effective diameter position on the image-side surface of the sixth lens element onto an optical axis is closer to an imaged object than an axial vertex on the object-side surface of the sixth lens element.

16. The photographing lens assembly of claim 1, wherein the object-side surface of the sixth lens element is convex at a paraxial region thereof and comprises two inflection points between the paraxial region thereof and a peripheral region thereof.

17. The photographing lens assembly of claim 1, wherein the axial distance between the second lens element and the third lens element is larger than an axial distance between the first lens element and the second lens element.

18. The photographing lens assembly of claim 1, wherein a curvature of an object-side surface of the third lens element is weaker than a curvature of an image-side surface of the third lens element.

19. A photographing lens assembly comprising, in order from an object side to an image side:
   a first lens element with positive refractive power having a convex object-side surface;
   a second lens element having refractive power;
   a third lens element having refractive power;
   a fourth lens element having refractive power;
   a fifth lens element with negative refractive power having a convex abject-side surface and a concave image-side surface, wherein the object-side surface and the image-side surface of the fifth lens element are aspheric, and the fifth lens element has at least one inflection point on at least one of the object-side surface and the image-side surface thereof; and
   a sixth lens element with negative refractive power having a concave image-side surface, wherein an object-side surface and the image-side surface of the sixth lens element are aspheric, and the sixth lens element has at least one inflection point on at least one of the object-side surface and the image-side surface thereof;
   wherein the photographing lens assembly has a total of six lens elements with refractive power, each of the first lens element, the second lens element, the third lens element, the fourth lens element, the fifth lens element and the sixth lens element is a single and non-cemented lens element, a focal length of the fifth lens element is f5, a focal length of the sixth lens element is f6, an axial distance between the second lens element and the third lens element is T23, an axial distance between the third lens element and the fourth lens element is T34, an axial distance between the object-side surface of the first lens element and the image-side surface of the sixth lens element is TD, a maximum image height of the photographing lens assembly is Y, an axial distance between the image-side surface of the sixth lens element and an image plane is BL, and the following relationships are satisfied:

$0 < f6/f5 < 1.2$;

$0.5 < T34/T23 < 1.7$; and $(TD/Y)+(BL/Y) < 1.65$.

20. The photographing lens assembly of claim 19, wherein the third lens element has a convex image-side surface.

21. The photographing lens assembly of claim 19, wherein the axial distance between the object-side surface of the first lens element and the image-side surface of the sixth lens element is TD, the maximum image height of the photographing lens assembly is Y, the axial distance between the image-side surface of the sixth lens element and the image plane is BL, and the following relationship is satisfied:

$(TD/Y)+(BL/Y)\leq 1.50.$

22. The photographing lens assembly of claim 19. wherein an f-number of the photographing lens assembly is Fno, and the following relationship is satisfied:

$1.2<Fno\leq 2.17.$

23. The photographing lens assembly of claim 19, wherein an incident angle of the chief y the maximum image height on the image plane is CRA, and the following relationship is satisfied:

$30\ degrees<CRA<50\ degrees.$

24. The photographing lens assembly of claim 19, wherein an axial distance between the fourth lens element and the fifth lens element is T45, an axial distance between the fifth lens element and the sixth lens element is T56, and the following relationship is satisfied.

$0<T45/T56<0.27.$

25. The photographing lens assembly of claim 19, wherein a focal length of the fourth lens element is f4, the focal length of the sixth lens element is f6, and the following relationship is satisfied:

$-3.0<f4/f6<-0.68.$

26. The photographing lens assembly of claim 19, wherein the axial distance between the second lens element and the third lens element is larger than a central thickness of the second lens element.

27. The photographing lens assembly of claim 19, wherein a distance between a point on an optical axis of the object-side surface of the sixth lens element and a projection point of a maximum effective diameter position on the object-side surface of the sixth lens element onto the optical axis is smaller than a distance between a point on the optical axis of the image-side surface of the sixth lens element and projection point of a maximum effective diameter position on the image-side surface of the sixth lens element onto the optical axis.

* * * * *